United States Patent
Palaiah et al.

(10) Patent No.: US 11,397,650 B1
(45) Date of Patent: Jul. 26, 2022

(54) METHODS AND SYSTEMS FOR PROTECTING VIRTUAL MACHINE DATA IN NETWORKED STORAGE SYSTEMS

(71) Applicant: NETAPP, INC., Sunnyvale, CA (US)

(72) Inventors: Balamurali Palaiah, Gilroy, CA (US); Kavish Pahade, Fremont, CA (US); Vrishali Thorat, Fremont, CA (US); Vineeth Karinta, Apex, NC (US); Rajaram Balakrishnan, Fremont, CA (US); Jayakrishnan Ramakrishna Pillai, Fremont, CA (US); Sachin Anil Gandhi, Fremont, CA (US); Priyanka Kasinath Surakanti, Livermore, CA (US)

(73) Assignee: NETAPP, INC., San Jose, CA (US)

( * ) Notice: Subject to any disclaimer, the term of this patent is extended or adjusted under 35 U.S.C. 154(b) by 0 days.

(21) Appl. No.: 17/239,292

(22) Filed: Apr. 23, 2021

(51) Int. Cl.
*G06F 11/00* (2006.01)
*G06F 11/14* (2006.01)

(52) U.S. Cl.
CPC ...... *G06F 11/1484* (2013.01); *G06F 11/1435* (2013.01); *G06F 11/1451* (2013.01); *G06F 11/1469* (2013.01); *G06F 2201/84* (2013.01)

(58) Field of Classification Search
CPC ............. G06F 11/1435; G06F 11/1451; G06F 11/1469; G06F 2201/184
See application file for complete search history.

(56) References Cited

U.S. PATENT DOCUMENTS

| | | | |
|---|---|---|---|
| 7,716,183 B2* | 5/2010 | Lee ..................... | G06F 11/1446 707/639 |
| 9,529,885 B1* | 12/2016 | Natanzon ............. | G06F 9/45533 |
| 9,535,907 B1 | 1/2017 | Stringham | |
| 9,575,792 B2 | 2/2017 | Robinson et al. | |
| 10,250,679 B1 | 4/2019 | Natanzon et al. | |
| 10,423,609 B1* | 9/2019 | Strauss ................. | G06F 16/128 |
| 10,496,487 B1* | 12/2019 | Natanzon ............. | G06F 11/1448 |
| 10,642,694 B2* | 5/2020 | Mageswaran ....... | G06F 11/2094 |
| 10,831,387 B1* | 11/2020 | Venkatesan ........... | G06F 3/0632 |
| 10,924,548 B1 | 2/2021 | Karumbunathan et al. | |
| 11,263,171 B2* | 3/2022 | Borate .................. | G06F 16/128 |
| 2004/0030846 A1* | 2/2004 | Armangau ............ | G06F 16/128 711/154 |
| 2007/0180304 A1* | 8/2007 | Kano .................. | G06F 11/1469 714/6.32 |
| 2008/0183973 A1* | 7/2008 | Aguilera ............. | G06F 11/2094 711/147 |
| 2008/0320258 A1* | 12/2008 | Wayda ................ | G06F 11/1435 711/162 |

(Continued)

*Primary Examiner* — Loan L. T. Truong

(74) *Attorney, Agent, or Firm* — Klein, O'Neill & Singh, LLP

(57) ABSTRACT

Methods and systems for protecting virtual machines is provided. One method includes identifying a plurality of volumes of a primary storage system for storing a plurality of data containers of a virtual machine ("VM"); generating a consistency group ("CG") snapshot of the plurality of volumes; associating a single instance storage clone of each data container of the VM from the CG snapshot to an active file system of the primary storage system; and generating metadata for representing a VM backup as a set having each of the single instance storage clone of each data container.

20 Claims, 14 Drawing Sheets

(56) References Cited

U.S. PATENT DOCUMENTS

| | | | |
|---|---|---|---|
| 2011/0258381 A1* | 10/2011 | Rossi | G06F 11/2082 |
| | | | 711/114 |
| 2014/0156602 A1* | 6/2014 | Adkins | G06F 16/40 |
| | | | 707/649 |
| 2015/0134879 A1* | 5/2015 | Zheng | G06F 3/067 |
| | | | 711/103 |
| 2016/0306840 A1* | 10/2016 | Deshmukh | G06F 16/27 |
| 2017/0031774 A1* | 2/2017 | Bolen | G06F 3/0619 |
| 2018/0157752 A1* | 6/2018 | Arikatla | G06F 16/182 |
| 2019/0155696 A1 | 5/2019 | Gill et al. | |
| 2020/0097370 A1* | 3/2020 | Srinivasan | G06F 11/1469 |
| 2020/0233750 A1* | 7/2020 | Ashokkumar | G06F 9/54 |
| 2020/0409738 A1 | 12/2020 | Naidu et al. | |
| 2021/0279088 A1* | 9/2021 | Kochavara | G06F 3/0664 |

\* cited by examiner

METHODS AND SYSTEMS FOR PROTECTING VIRTUAL MACHINE DATA IN NETWORKED STORAGE SYSTEMS

TECHNICAL FIELD

The present disclosure relates to networked storage systems and more particularly to, protecting virtual machine data.

BACKGROUND

Various forms of storage systems are used today. These forms include direct attached storage (DAS) systems, network attached storage (NAS) systems, storage area networks (SANs), and others. Network storage systems are commonly used for a variety of purposes, such as providing multiple users with access to shared data, backing up data and others.

A storage system typically includes at least one computing system executing a storage operating system for storing and retrieving data on behalf of one or more client computing systems ("clients"). The storage operating system stores and manages shared data containers in a set of mass storage devices. The storage operating system typically uses storage volumes (may also be referred to as volumes) (or logical unit numbers (LUNS)) to store data. Each volume may be configured to store data files (data containers or data objects), scripts, word processing documents, executable programs, and any other type of structured or unstructured data. From the perspective of a computing device using the storage system, each volume can appear to be a single storage drive. However, each volume can represent the storage space in one storage device, an aggregate of some or all the storage space in multiple storage devices.

Storage systems are used extensively in virtual environments where a physical resource is time-shared among a plurality of independently operating processor executable virtual machines. Typically, storage space is presented to a virtual machine as a virtual file. A storage drive (for example, C:\) is then presented on a computing device via a user interface within a virtual machine context. The virtual machine can use the storage drive to access storage space to read and write information.

Multiple virtual machines can use multiple volumes to store data. The volumes can be configured as a group, where the group operates as an independent logical structure. To protect a specific virtual machine data and virtual machine configuration information can be challenging when the group structure is used. Conventional systems, typically take a point-in-time backup (or snapshot) of all the volumes within the group and use the snapshot to protect the files associated with a specific virtual machine. This can be very inefficient where 1000s of virtual machines use the same volume group to store data and the storage system will have to store 1000's of snapshots of the plurality of volumes to protect each virtual machine at a granular level. Therefore, the conventional approach consumes massive amounts of storage space, and hence is undesirable. Therefore, a better solution is needed to protect individual virtual machines at a granular level.

BRIEF DESCRIPTION OF THE DRAWINGS

The foregoing features and other features will now be described with reference to the drawings of the various aspects of the present disclosure. In the drawings, the same components have the same reference numerals. The illustrated aspects are intended to illustrate, but not to limit the present disclosure. The drawings include the following Figures.

DETAILED DESCRIPTION

Figure 1A:
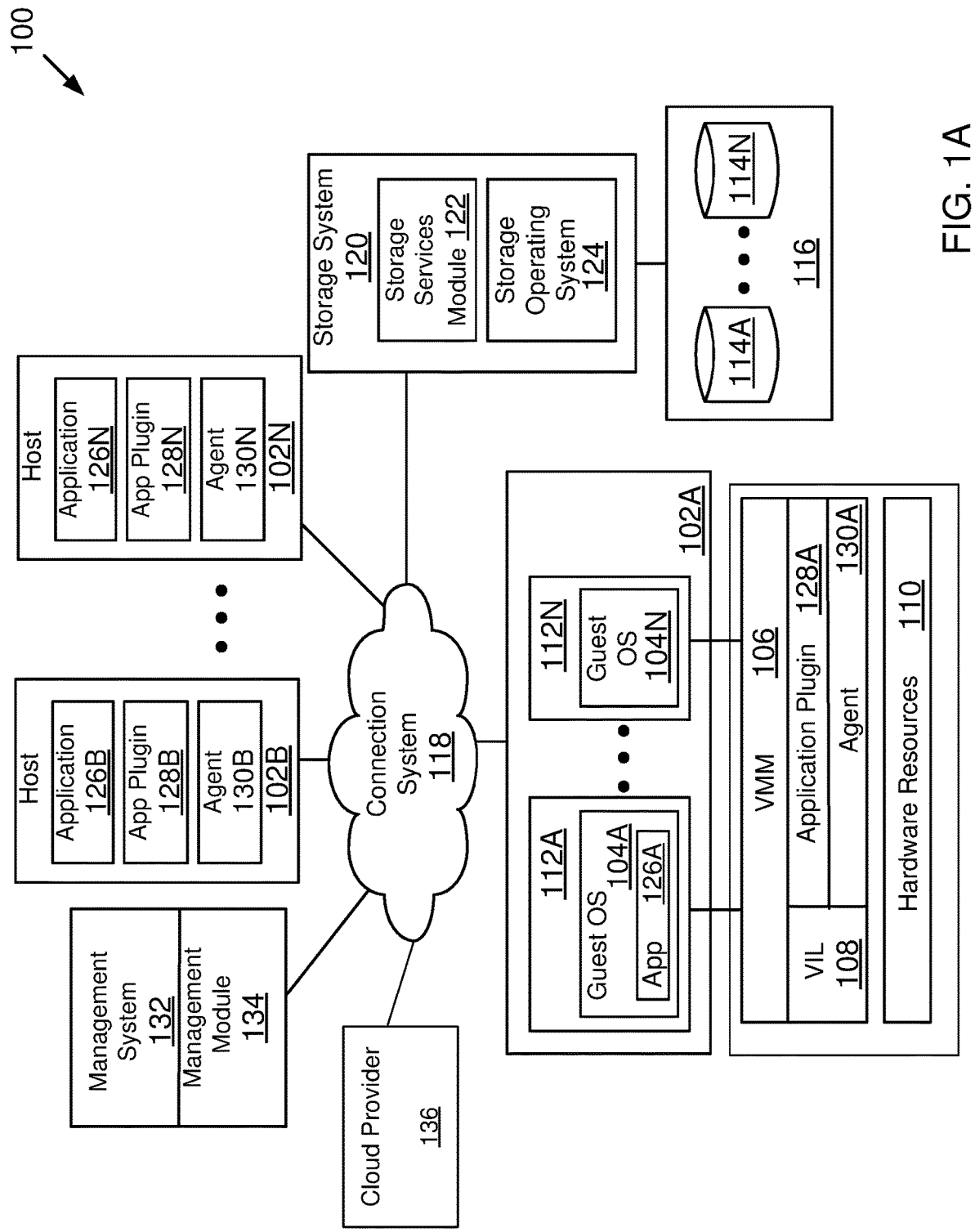
FIG. 1A shows an example of an operating environment for the various aspects of the present disclosure.

In one aspect, innovative computing technology is disclosed to protect specific virtual machine (also referred to as a "VM") related data at a granular level. VMs are executed in a virtual machine environment and time-share a physical resource. A VM functions as a self-contained platform, running its own operating system (OS) and computer executable, application software. As described below in detail, VMs are presented with storage space to store VM data as files (also referred to as data containers). A plurality of VMs can share a plurality of storage volumes (also referred interchangeably as "volumes") to store and retrieve data. The volumes are configured to be part of a volume group that operates as an independent logical structure.

To protect VM files, a consistency group ("CG") snapshot is taken of the volumes that store the VM files. The CG snapshot creates a consistency point for the volumes of the volume group to ensure that all the data captured by the CG snapshot across the volume is consistent. Thereafter, a single instance storage (SIS) clone of each file of the VM is generated. The term SIS file clone in this context means that each SIS file clone operates as an independent file but points to the same physical location where the VM file is stored in the generated CG snapshot. The list of SIS file clones is associated with an active file system of a storage system and mapped to the VM files. The VM backup is represented by the set of SIS file clones. Thereafter, the CG snapshot is deleted. This technology efficiently uses storage space because, unlike conventional systems, storage space consuming CG snapshots are not retained to maintain VM backups. This technology is especially useful in an environment where multiple VMs use the same volume group and the system does not have to maintain multiple CG snapshots, which results in saving storage space.

To protect VM data of a primary storage system, a secondary backup of the VM is taken at a secondary storage system. The file clone based VM backup process described above is repeated at the primary storage system. The file clone based VM backup is captured in a transfer snapshot and transferred to the secondary storage system. A latest transferred snapshot is used to maintain the secondary backup copy. Previously transferred snapshots can be deleted when they are not referenced by any other VM backup. This innovative technology again saves storage space because unlike conventional systems, the secondary storage system does not have to maintain multiple snapshot copies, and hence waste storage space, as described below in detail.

As preliminary note, the terms "component", "module", "system," and the like as used herein are intended to refer to a computer-related entity, either software-executing general-purpose processor, hardware, firmware and a combination thereof. For example, a component may be, but is not limited to being, a process running on a processor, a hardware-based processor, an object, an executable, a thread of execution, a program, and/or a computer.

By way of illustration, both an application running on a server and the server can be a component. One or more components may reside within a process and/or thread of execution, and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, at non-transitory, computer readable media including, but not limited to, an ASIC (application specific integrated circuit), CD (compact disc), DVD (digital video disk), ROM (read only memory), solid state drive, hard disk, EEPROM (electrically erasable programmable read only memory), non-volatile memory or any other storage device, in accordance with the claimed subject matter.

System 100: FIG. 1A shows an example of a system 100, to implement the various adaptive aspects of the present disclosure. In one aspect, system 100 includes computing systems 102A-102N (shown as host 102A-102N and may also be referred to as a "host system 102", "host systems 102", "server 102" or "servers 102") communicably coupled to a storage system 120 executing a storage operating system 124 and a storage services module 122 via a connection system 118 such as a local area network (LAN), wide area network (WAN), the Internet and others. As described herein, the term "communicably coupled" may refer to a direct connection, a network connection, or other connections to enable communication between computing and network devices.

In one aspect, system 100 may also include a cloud provider 136 (e.g., Amazon Web Services ("AWS") provided by Amazon Inc, Azure provided by Microsoft Corporation, Google Cloud Platform provided by Alphabet Inc. (without derogation of any trademark rights of Amazon Inc., Microsoft Corporation or Alphabet Inc.), or any other cloud provider) that provides access to cloud-based storage via a cloud layer (not shown) executed in a cloud computing environment. Cloud computing means computing capability that provides an abstraction between the computing resource and its underlying technical architecture (e.g., servers, storage, networks), enabling convenient, on-demand network access to a shared pool of configurable computing resources that may be rapidly provisioned and released with minimal management effort or service provider interaction. The term "cloud" herein is intended to refer to a network, for example, the Internet and cloud computing allows shared resources, for example, software and information to be available, on-demand, like a public utility.

Typical cloud computing providers deliver common business applications online which are accessed from another web service or software like a web browser, while the software and data are stored remotely on servers. The cloud computing architecture uses a layered approach for providing application services. A first layer is an application layer that is executed at client computers. After the application layer is a cloud platform and cloud infrastructure, followed by a "server" layer that includes hardware and computer software designed for cloud specific services.

System 100 also includes a management system 132 that executes instructions for a management module (or application) 134 for coordinating storage services related operations (for example, backups at a primary storage system (e.g., 120) and a secondary storage system (e.g., 120), restore, cloning and other operations), described below in detail. Although the management system 132 with the management module 134 is shown as a stand-alone module, it may be implemented with other applications, for example, within a virtual machine environment described below. Furthermore, the management system 132 and the management module 134 may be referred to interchangeably throughout this specification.

In one aspect, host systems 102B-102N may execute a plurality of applications 126A-126N (may also be referred to as "application 126" or "applications 126"), for example, an email server (Exchange server), a database application and others. These applications may be executed in different operating environments, for example, a virtual machine environment of host 102A, Windows, Solaris, Unix and others. The applications 126 may use storage system 120 to store information at storage devices, as described below.

To protect information associated with each application, a plugin module (shown as application plugins 128A-128N) are executed at host systems 102. The term plugin as used herein means a processor executable layer that is customized to interface with a specific application, e.g., a virtual machine, a database application, a file system, an operating system, and others, described below in detail. The term protect means to backup an application and/or backup associated information (including configuration information, data (e.g., files, directories, structured or unstructured data, may jointly be referred to as data containers) and others).

Each host system 102 executes an agent 130A-130N that interfaces with the management module 134 and the various application plugins for managing backups, restore, cloning and other operations, as described below in detail.

In one aspect, the storage system 120 has access to a set of mass storage devices 114A-114N (may be referred to as "storage devices 114" or "storage device 114") within at least one storage subsystem 116. The storage devices 114 may include writable storage device media such as solid-state drives, storage class memory, magnetic disks, video tape, optical, DVD, magnetic tape, non-volatile memory devices for example, self-encrypting drives, or any other storage media adapted to store structured or non-structured data. The storage devices 114 may be organized as one or more groups of Redundant Array of Independent (or Inexpensive) Disks (RAID). The various aspects disclosed are not limited to any specific storage device or storage device configuration.

The storage system 120 provides a set of volumes to host systems 102 via the connection system 118. The storage operating system 124 can present or export data stored at storage devices 114 as a volume (or a logical unit number (LUN) for storage area network ("SAN") based storage). Each volume may be configured to store data files (or data containers or data objects), scripts, word processing documents, executable programs, and any other type of structured or unstructured data. From the perspective of one of the client systems, each volume can appear to be a single storage drive. However, each volume can represent the storage space in one storage device, an aggregate of some or all the storage space in multiple storage devices, a RAID group, or any other suitable set of storage space. An aggregate is typically managed by the storage operating system 124 and identified by a unique identifier (not shown).

The storage system 120 may be used to store and manage information at storage devices 114 based on a request generated by application 126 executed by host system 102 or any other entity. The request may be based on file-based access protocols, for example, the Common Internet File System (CIFS) protocol or Network File System (NFS) protocol, over the Transmission Control Protocol/Internet Protocol (TCP/IP). Alternatively, the request may use block-based access protocols for SAN storage, for example, the Small Computer Systems Interface (SCSI) protocol encapsulated over TCP (iSCSI) and SCSI encapsulated over Fibre Channel (FC), object-based protocol or any other protocol.

In a typical mode of operation, one or more input/output (I/O) requests are sent over connection system 118 to the storage system 120. Storage system 120 receives the I/O requests, issues one or more I/O commands to storage devices 114 to read or write the data on behalf of the host system 102, and issues a response containing the requested data over the network 118 to the respective host system 102.

Although storage system 120 is shown as a stand-alone system, i.e., a non-cluster-based system, in another aspect, storage system 120 may have a distributed architecture; for example, a cluster-based system that may include a separate network module and storage module. Briefly, the network module is used to communicate with host systems 102, while the storage module is used to communicate with the storage devices 114, as described below with respect to FIG. 2A.

Alternatively, storage system 120 may have an integrated architecture, where the network and data components are included within a single chassis. The storage system 120 further may be coupled through a switching fabric to other similar storage systems (not shown) which have their own local storage subsystems. In this way, all the storage subsystems can form a single storage pool, to which any client of any of the storage servers has access.

In one aspect, the storage services module 122 at the storage system 120 coordinates volume backups, cloning, restore and replication for different applications including VMs. Although the storage services module 122 is shown as a single block, it may include various modules for taking backups, executing restore operations, replicating backups from one location to another and so forth. As described below, backups and other operations may be performed using the management system 132 and the management module 134. As an example, taking backups may include taking "snapshots," i.e., a point-in-time copy of a volume. The point-in-time copy captures all the information in a volume. The snapshot may be used to restore a volume at any given time, as described below.

One or more of the host systems (for example, 102A) may execute a virtual machine environment where a physical resource is time-shared among a plurality of independently operating processor executable VMs. Each VM may function as a self-contained platform, running its own operating system (OS) and computer executable, application software. The computer executable instructions running in a VM may be collectively referred to herein as "guest software." In addition, resources available within the VM may be referred to herein as "guest resources."

The guest software expects to operate as if it were running on a dedicated computer rather than in a VM. That is, the guest software expects to control various events and have access to hardware resources on a physical computing system (may also be referred to as a host system) which may be referred to herein as "host hardware resources". The host hardware resource may include one or more processors, resources resident on the processors (e.g., control registers, caches and others), memory (instructions residing in memory, e.g., descriptor tables), and other resources (e.g., input/output devices, host attached storage, network attached storage or other like storage) that reside in a physical machine or are coupled to the host system.

Referring to FIG. 1A, host system 102A provides a processor executable virtual machine environment executing a plurality of VMs 112A-112N (may also be referred to as "VM 112" or "VMs 112"). VMs 112A-112N execute a plurality of guest OS 104A-104N (may also be referred to as guest OS 104) that share hardware resources 110. As described above, hardware resources 110 may include CPU, memory, I/O devices, storage or any other hardware resource.

In one aspect, host system 102A may also include a virtual machine monitor (VMM) 106, for example, a processor executed hypervisor layer provided by VMWare Inc., Hyper-V layer provided by Microsoft Corporation of Redmond, Wash. (without derogation of any third-party trademark rights) or any other layer type. VMM 106 presents and manages the plurality of guest OS 104A-104N executed by the host system 102A.

In one aspect, VMM 106 is executed by host system 102A with VMs 112A-112N. In another aspect, VMM 106 may be executed by an independent stand-alone computing system, often referred to as a hypervisor server or VMM server and VMs 112A-112N are presented on another computing system.

It is noteworthy that various vendors provide different virtualization environments, for example, VMware Corporation, Microsoft Corporation and others (without derogation of any third-party trademark rights). The generic virtualization environment described above with respect to FIG. 1A may be customized depending on the virtual environment provider.

VMM 106 may include or interface with a virtualization layer (VIL) 108 that provides one or more virtualized hardware resource 110 to each OS 104A-104N. VMM 106 also includes or interfaces with a hypervisor plugin (shown as application plugin 128A) and the agent 130A.

Figure 1B:
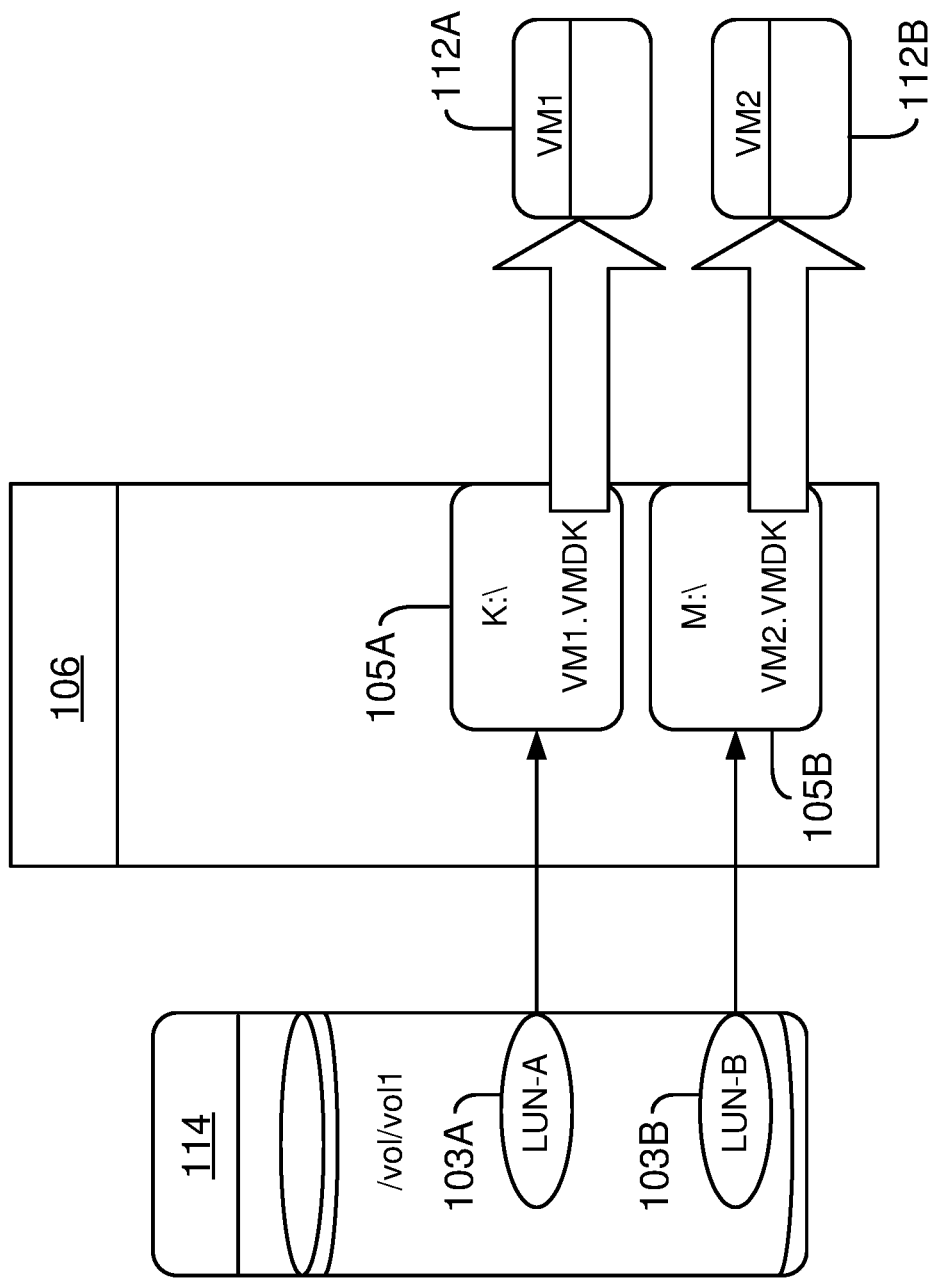
FIG. 1B shows an example of presenting storage space to a virtual machine, according to one aspect of the present disclosure.

VM Virtual Storage: Before describing the details of the various aspects of the present disclosure, the following provides an example of presenting logical storage space to one or more VMs with respect to FIG. 1B. Storage operating system 124 typically presents storage space at storage device 114 as a virtual storage drive (for example, LUNs, virtual hard disks ("VHDs"), virtual machine disks "VMDKs") and any other format) to VMM 106. For example, LUN-A 103A and LUN-B 103B at storage device 114 for a volume labeled as "vol1" are presented to VMM 106 that hosts VMs 112A (VM1)-112B (VM2).

VMM 106 creates a file system on the LUNs and generates one or more virtual drive files. e.g., in a VMDK or VHD format. VMDK and VHD are two common virtual drive formats that are commonly used by VMs to access storage. The VM is then presented with a storage drive to store data. For example, VM1.VMDK 105A is created on LUN-A 103A and then presented as drive K:\ to VM1 112A. An application in VM1 112A uses K:\ to access storage space for reading and writing information. Similarly, VM2.VMDK 105B is created on LUN-B 103B and appears as M:\ drive for VM 112B. An application in VM2 112B uses M:\ drive to store information. It is noteworthy that different operating systems may present virtual storage drives in different formats. The various aspects described herein are not limited to any particular format.

In some instances, VMM 106 does not create a file system for the LUNs and instead the LUNs are presented directly to the VM as a storage drive. The storage drives in such an instance may be referred to as "pass through" drives. The terms VMDK/VHD and pass-through disks as used herein for presenting a virtual storage drive via a VM are used interchangeably throughout this specification.

Figure 1C:
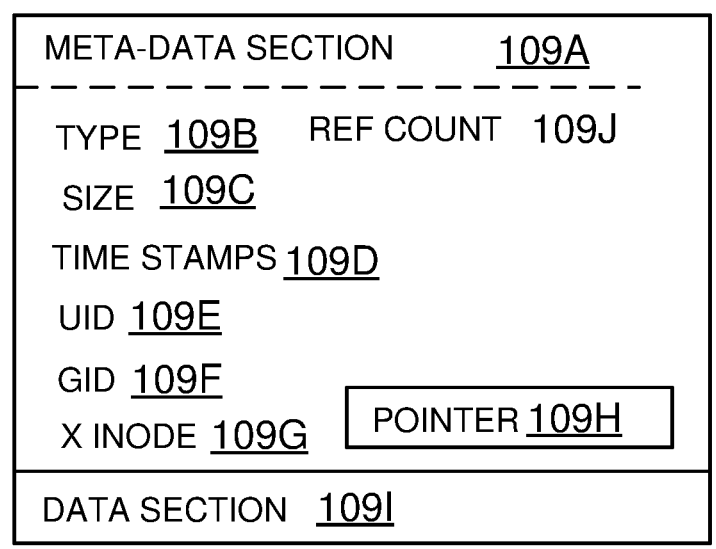
FIG. 1C shows an example of an inode used by a storage system to store data, according to one aspect of the present disclosure.

Inode: FIG. 1C shows an example of an inode structure 109 (may also be referred to as inode 109) used by the storage operating system 124 to store and retrieve data, as well as to take snapshots of volumes maintained by the storage operating system 124. Inode 109 may include a meta-data section 109A and a data section 109I. The information stored in meta-data section 109A of each inode 109 describes a data container and, as such, may include the type (e.g., regular or directory) 109B, size 109C of the data container, time stamps (e.g., access and/or modification) 109D for the data container and ownership, i.e., user identifier (UID 109E) and group ID (GID 109F), of the data container. The metadata section 109A further includes a x-inode field 109G with a pointer 109H that references another inode structure containing, e.g., access control list (ACL) information associated with the data container or directory.

The meta-data section also includes a reference count 109J that provides a count of different data containers that may be referencing this inode structure. The reference count may be used to track snapshots or file clones, as described below in detail.

The contents of data section 109I of each inode 109 may be interpreted differently depending upon the type of data container (inode) defined within the type field 109B. For example, the data section 109I of a directory inode structure includes meta-data controlled by the file system, whereas the data section of a "regular inode" structure includes user-defined data. In this latter case, the data section 109I includes a representation of the data associated with the data container.

Specifically, data section 109I of a regular inode data container may include user data or pointers, the latter referencing, for example, 4 KB data blocks for storing user data at a storage location at storage device 114. Each pointer is preferably a logical volume block number.

Inode structure 109 may have a restricted size (for example, 128 bytes). Therefore, user data having a size that is less than or equal to 64 bytes may be represented, in its entirety, within the data section of an inode. However, if the user data is greater than 64 bytes but less than or equal to, for example, 64 kilobytes (KB), then the data section of the inode comprises up to 16 pointers, each of which references a 4 KB block of data stored at a disk. Moreover, if the size of the data is greater than 64 kilobytes but less than or equal to 64 megabytes (MB), then each pointer in the data section 109I of the inode references an indirect inode that contains 1024 pointers, each of which references a 4 KB data block on disk.

Figure 1D:
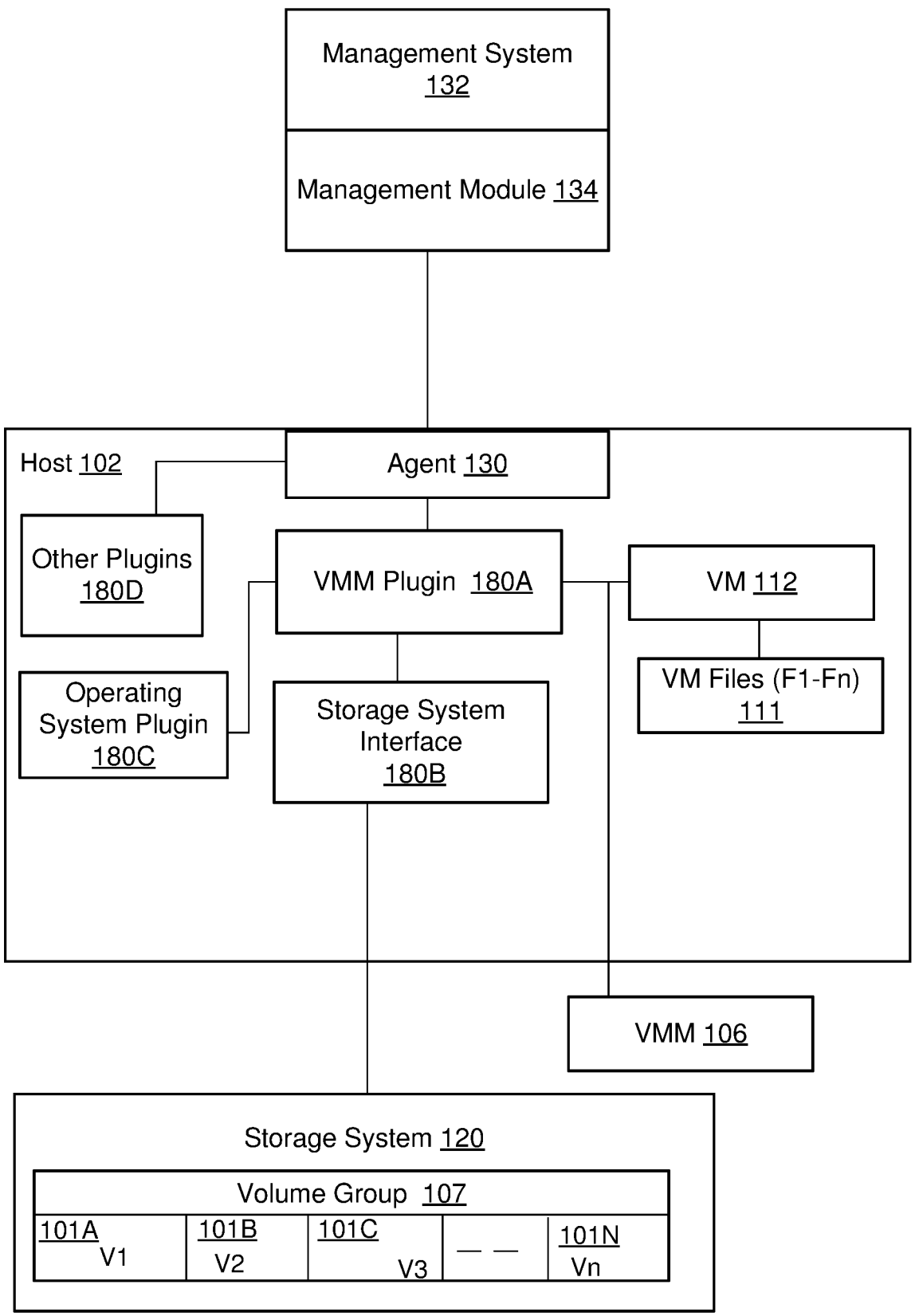
FIG. 1D shows a block diagram of a host system of FIG. 1A, according to one aspect of the present disclosure.

Host 102: FIG. 1D shows an example of a portion of system 100 that can be used for protecting and restoring a VM 112, according to one aspect of the present disclosure. As an example, host 102 (similar to 102A, FIG. 1A)) executes a VMM plugin 180A (may also be referred to as plugin 180A) that interfaces with VMM 106 for executing storage services including backup and restore operations. A storage system interface 180B is executed to interface with storage system 120 as described below in details. Host 102 may also execute an operating system plugin 180C for retrieving any operating system related information for executing storage services. The host 102 may also execute other plugins 180D, which includes application plugins (shown as 128A-128N) in FIG. 1A), e.g., database plugins that are used to execute a storage service associated with a specific database type.

In one aspect, VM 112 uses a volume group 107 having a plurality of volumes 101A-101N (may also be referred to as "volume 101" or "volumes 101") to store a plurality of VM files, F1-Fn 111 (also referred to as files 111) at storage system 120. As mentioned above with respect to FIG. 1B, storage space of storage system 120 can be presented in the VMDK (or VHD) format. The volume group 107 operates as an independent logical structure with a unique identifier to store the VM files across volumes 101. The volume group 107 is flexible and can include any number of volumes i.e., the number of volumes in the volume group 107 can be increased or decreased based on VM 112 needs.

In one aspect, to backup VM 112, agent 130 (e.g., at host 102 or 130A at host 102A (FIG. 1A)) interfaces with the management module 134 at the management system 132 via a network connection. The agent 130 receives a backup request either from the management system 132 or any other entity. In another aspect, the backup is based on a predefined schedule of a backup policy. The agent 130 initiates the backup process by instructing the plugin 180A to obtain a VM file layout i.e., a list of all VM files 111. The plugin 180A is customized to interface with VMM 106 for discovery, backup and restore operations, as described below in detail. The plugin 180A obtains the VM file layout from the VMM 106. The file layout indicates the file names and file size of the files 111. The plugin 180A also obtains the volume layout for volumes 101 within volume group 107 that store files 111. The volume layout identifies the volumes within volume group 107. Thereafter, a storage footprint for files 111 is obtained by the storage system interface 180B. In one aspect, a storage abstraction layer 138A (see FIG. 1G) of agent 130 interfaces with the storage system interface 180B to obtain the storage footprint. The storage footprint identifies a path indicating the location of each stored file, a storage system identifier that identifies the storage system 120, a physical storage location where the files 111 are stored or any other storage related information that is not available to VMM 106.

A consistency group ("CG") snapshot process is initiated by the SAL 138A. The CG snapshot process is initiated by establishing a consistency point for volumes 101 that store VM files 111. This means that all the data at a point-in-time across volumes 101 is consistent. To achieve the consistency, any write requests for volumes 101 received while the snapshot is being taken are held (or fenced) until the CG snapshot process is complete. The CG snapshot itself is a point-in-time copy of the data stored using volumes 101. The CG snapshot is taken by the storage services module 122 interfacing with the storage operating system 124. Once the snapshot has been taken, the fenced write requests are executed by the storage operating system 124.

Once the CG snapshot is taken, the SAL 138A creates a single instance storage ("SIS") clone of each VM file 111. The term SIS file clone in this context means that each SIS file clone operates as an independent file but points to the same physical location where the VM file is stored in the generated CG snapshot. The SIS file clone is associated with an active file system (AFS) of the storage operating system 124. This means that the SIS file clone copy from the CG snapshot is copied to the AFS. The AFS is the file system that is currently used by the storage operating system 124 at any given time. Thereafter, the SAL 138A requests that the CG snapshot be deleted. The metadata for the SIS file clone based VM backup is generated and stored in a data structure for example, VM backup metadata 115 shown in FIG. 1K. The backup metadata 115 represents a file clone-based backup of VM 112 as a set of SIS file clones. The metadata includes the configuration of the VM 112, identity of each VM file 113 and a file clone mapping that maps each SIS file clone to each VM file.

To restore from the VM 112 backup, the file clones that are recorded in the backup metadata 115 are identified. Thereafter, a clone of each file clone in the backup is created. The VM 112 is then associated by the plugin 180A with the set of clones of the file clones identified by the VM backup metadata. Details of executing a backup and restore operation are provided below with respect to FIGS. 1H and 1I, respectively.

Figure 1E:
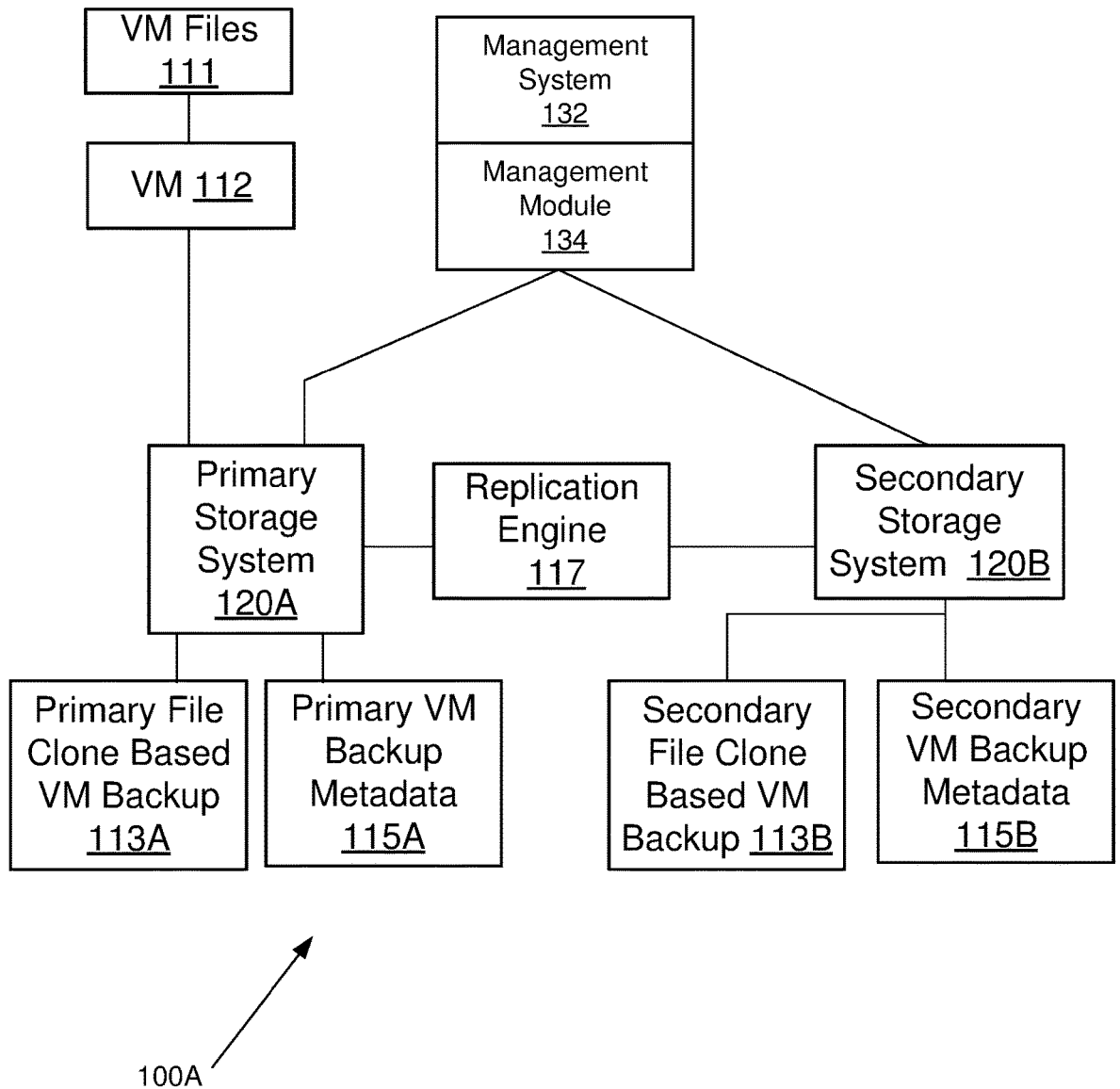
FIG. 1E shows an example of replicating a virtual machine backup and backup metadata from a primary storage system to a secondary storage system, according to one aspect of the present disclosure.
Figure 1F:
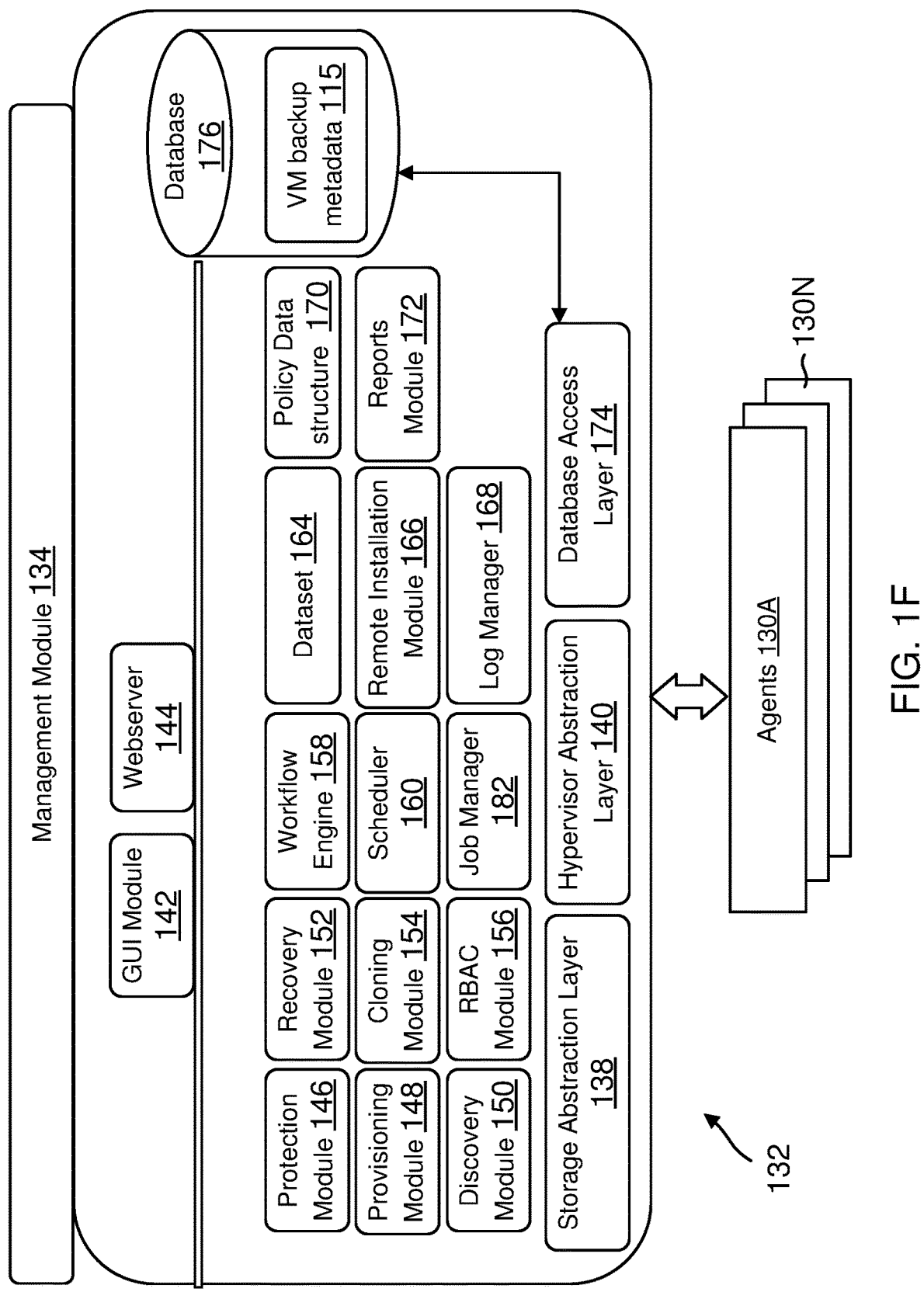
FIG. 1F shows a block diagram of a management module used for backup and restore of a virtual machine, according to one aspect of the present disclosure.

Secondary VM Backups: FIG. 1E shows a system 100A with various components that are similar to the system 100 of FIG. 1A for taking a VM backup at a secondary storage system 120B (similar to storage system 120, FIG. 1A), according to one aspect of the present disclosure. In system 100A, a primary storage system 120A (similar to storage system 120) stores a file clone based VM backup 113A and the associated VM backup metadata 115A (similar to 115 shown in FIG. 1K). The VM backup metadata 115A is also stored at the database 176 of management system 132 (FIG. 1F). To take a secondary backup, first the file clone based VM backup is taken at the primary storage system 120A. A transfer snapshot is then taken of the volumes that store the file clones for the file clone-based backup. A replication engine 117 transmits the transfer snapshot(s) and the associated snapshot metadata to the secondary storage system 120B. Although the replication engine 117 is shown as a separate block, it may be integrated with the storage system 134 at the primary storage system 120A. The replication engine 117 replicates the backup and the associated metadata based on a replication policy.

To store the secondary file clone based VM backup (shown as 113B with metadata 115B (similar to 167, FIG. 1K)) a mapping of the list of file clones in the primary VM backup 113A is mapped to the list of file clones in the transferred snapshot. To efficiently maintain retention count for the secondary backups, the latest transferred snapshot is associated with the file clone based VM backup 113B. Previously transferred snapshots can be deleted if they are not referenced by any other VM backup as tracked by a data structure (shown as secondary snapshot reference tracker 169, FIG. 1K). Details of handling the backup at the secondary storage system 120B are provided below with respect to FIG. 1J.

Management System 132: FIG. 1F shows a block-level diagram of the management system 132 with the management module 134, used according to one aspect of the present disclosure. The management module 134 may be executed by a stand-alone system or may interface with another management console/application to manage and interface with multiple instances of agents' 130A-130N. The management module 134 may also be implemented as an application within a VM environment of host 102A (see FIG. 1A/host 102, FIG. 1D). Furthermore, the management module 134 can be implemented as a "micro-service" within a cloud layer (not shown). The term micro-service as used herein denotes computing technology for providing a specific functionality in system 100. As an example, the management module 134 can be deployed as a container (e.g., a "Docker" container) that is stateless in nature, may be exposed as a REST (representational state transfer) application programming interface (API), which is discoverable by other services. Docker is a software framework for building and running micro-services using the Linux kernel (without derogation of any third-party trademark rights). The various aspects described herein are not limited to the Linux kernel. Docker micro-service code for the management module 134 can be packaged as a "Docker image file". A Docker container is initialized using an associated image file. A Docker container is an active or running instantiation of a Docker image. Each Docker container provides isolation and resembles a lightweight virtual machine.

As an example, the management module 134 includes a graphical user interface (GUI) module 142 that presents a GUI at a display device, for example, a monitor, a smart phone, tablet or any other display device type. The GUIs may be used to interface with the management system 132 and its components, for example, to backup, replicate and/or restore a VM using a volume group to store VM files, as described above. It is noteworthy that the various aspects described herein are not limited to any specific GUI type because a command line interface (CLI) may also be used to implement the adaptive aspects described herein.

The management module 134 may also include a web server 144 for enabling Internet based communication. As an example, web server 144 may be implemented as an Internet Information Services (IIS) for a Windows® Server web server (without derogation of any third-party trademark rights). The web server 144 interfaces with a workflow engine 158 that coordinates and manages various tasks that are performed by the different components of the management module 134.

In one aspect, the workflow engine 158 coordinates dataset 164 creation, policy allocation and manage a database 176. The workflow engine 158 communicates with various agents 130A-130N for host system related operations including backup and restore of VM files, as described below in detail.

In one aspect, the management module 134 also includes a protection module 146, a provisioning module 148, a discovery module 150, a recovery module 152, a cloning module 154, a role based access control (RBAC) module 156, a storage abstraction layer (may also be referred to as "SAL") 138, a hypervisor abstraction layer (may also be referred to as "HAL") 140, a scheduler 160, a job manager 182, a remote installation module 166, a log manager 168, a policy data structure 170, a reports module 172 and a database access layer 174 that can access the database (or any other data structure type) 176. The database 176 stores various data structures (or objects) (e.g., the data structures of FIG. 1K) in a format that allows the management module 134 to handle storage services for different applications/host systems.

The log manager 168 collects logs from agents 130 and the various plugins. The logs can then be presented via a GUI. The logs may be for event management and audit for various management system 132 operations. The logs may be collected for a job based on a job identifier.

The protection module 146 is used to enforce a policy for a storage services related job (e.g., backup and/or restore of a VM). The protection module 146 maintains a protection policy for a plurality of objects (e.g., VM 112, FIG. 1D) (or protection group) that are to be backed up and provides protection service for backing up the protection group objects. Based on an application object, a call is made to an appropriate plugin for providing the appropriate protection service.

In one aspect, protection module 146 maintains protection group objects for abstract representation of a container of application objects where protection of application objects is defined by policy objects. The protection group objects map to dataset objects 164 (shown as dataset 164).

The provisioning module 148 allows a user to configure and provision a volume group 107 (FIG. 1D) for a VM (e.g., 112). The provisioning module 148 allows a user to set a volume group size and appropriate permissions for using the volume group, for example, reading and writing data, permission for changing the volume group size, deleting the volume group and other operations. Volume information is saved in a standard format at database 176 and includes, name of the volume group, names of the volumes within the volume group, storage connection identifier, size, a junction path, date the volume group was created and other information.

The discovery module 150 interfaces with the agents 130A-130N executed at different host systems to obtain information regarding the host systems, storage resources used by various applications and information regarding data containers that are protected (i.e., backed up) and unprotected. The discovery module 150 also facilitates discovery and management of application specific objects, for example, VMs, databases, hypervisor, and others. Based on the application type, an appropriate plugin is used to discover different objects.

In one aspect, the discovery module 150 initiates a discovery operation with the agents 130 (shown as 130A-130N). An API presented by the management system 132 determines if an agent 130 is installed at a host 102. If the agent 130 is installed, then the agent 130 discovers the various plugins at that host 102. If the agent 130 is not installed, then it is installed by the remote installation module 166 and the appropriate plugins are installed as well.

The cloning module 154 is used to clone volumes that are maintained by the storage system 120. The cloning module 154 is also used for managing the life cycle of a clone. The term clone as used herein is a duplicate copy of a snapshot. The term clone life cycle management means generating a clone, refreshing a clone and deleting a clone based on user defined policies and requirements. Refreshing a clone means deleting an existing clone, generating a new snapshot and then creating the clone again.

The RBAC module 156 stores information regarding different clients/entities that are given access to storage. For example, a business unit may be allowed to read certain volumes and may not be allowed to backup, clone, replicate or delete any volume. The RBAC module 156 manages the various roles and access type for different applications that may be executed in different host systems/computing environments including a multitenant database environment described above.

In one aspect, RBAC module 156 includes an authentication and authorization module. User authentication may happen at multiple end points, for example, via a GUI login, a login API for clients or plugins and others. The authentication module authenticates users against different domain/subsystem requirements, for example, an Active Directory, a local Windows machine host system, open LDAP (lightweight directory protocol) and others. Once a user is authenticated, an encrypted token is generated based on user information. In another aspect, a hash token is generated based on the generated token. The hashed token is saved at database 176. The hashed token may be based on MD5 (Message Digest Algorithm, 5, SHA (secure hash algorithm)-1 or any other technique.

When the authenticated user logs back in, the user passes the token and the management system 132 decrypts the token, validates the token and regenerates the hash value. The hash value is compared with the stored hash value in database 176.

In one aspect, the authorization module of the RBAC module 156 creates custom roles (for example, an administrator, backup administrator, backup operator, backup viewer, restore administrator and others), modifies existing roles, assigns and unassigns permissions to and from a role (for example, a dataset, policy, host, storage connection, a dashboard, a report, discovery, remote installation and others), assigns and unassigns users to roles and assigns and unassigns resources (for example, hosts, datasets, policy and others).

In one aspect, roles determine a set of capabilities that are available to members of the role. For example, a backup administrator may be allowed to add a host system, add a volume group, install plugins, create a dataset, create a backup dataset, delete a dataset, create policies, delete backups, restore applications and others. A backup operator may be allowed to start and stop existing dataset jobs, monitor backups, view backup reports and perform application level restore operations. A backup viewer may be given read only access to backups, view existing backups and review job session details. A restore administrator may be allowed to perform restore operations using existing backups. The adaptive aspects described herein are not limited to these roles.

All the tasks conducted by the management module 134 are organized and monitored by the job manager 182. The job schedules are managed by the scheduler 160. When a new job arrives (e.g., to take a backup of VM 112, the job manager 182 stores the job information in a database (for example, 176) with other existing jobs. The job manager 182 creates sub-tasks for executing the appropriate workflows. The sub-tasks depend on the nature of the job (for example, backup, restore, cloning or others). The job manager 182 updates the status of each task to provide real-time updates via a GUI.

In one aspect, the policy data structure 170 is used to store polices for different stored objects (e.g., VMs 112A-112N, volumes and others). The policy information is configurable and may be changed by a user. In one aspect, the policy data structure 170 format is the same across different applications. This enables the management module 134 to manage storage services across different platforms with different requirements and operating parameters. The policy data structure 170 includes various policy objects to store various policies each with a set of attributes that can be applied to any dataset. The policy object stores a policy identifier, a policy name, description, a backup schedule policy, a retention count as to how long a backup is to be retained, a replication policy to replicate a backup from one location to another, types of backups, application consistent backups, and verification policies to verify a backup and others. It is noteworthy that a policy object may be shared across multiple datasets for multiple applications/plugins.

The reports module 172 is used to provide reports to users. The reports may be for different applications and in different formats.

In one aspect, the management module 134 maintains the dataset 164 for different applications and application objects, including VMs 112A-112N. Each dataset is uniquely identified and named. The dataset format for managing replication for different applications is the same, regardless of how the applications handle information. A dataset may be associated with a policy data structure that defines how an object is to be protected. The dataset format used by the various aspects of the present disclosure allows a user to add or remove stored objects that need to be protected.

In one aspect, dataset 164 represents a container of application objects where protection attributes may be defined in terms of backup policy, replication profiles and retention policies. Dataset 164 is a basic unit that is used to manage backup and restore operations described above. A user can add any permissible resource to the dataset from multiple host systems/applications.

The database access layer 174 saves information in the database 176. The database 176 may be used to store information that is discovered by the discovery module 150, policy information, host information, datasets and other information.

In one aspect, the database 176 may store various data structures for managing the storage services and providing status to users. As an example, the database schema for the database 176 is application format independent and may include various data structures to identify different host systems to specific login information, backup metadata structure (e.g. 115, 117, 163 and 169, FIG. 1K) for storing information regarding backups, a data structure to map backups to stored objects including VMs, databases and others, a data structure for storing information on backup types, i.e. application consistent, full backup, copy backup, log backup for identifying volumes that are involved in each backup, a data structure to track various jobs that are managed by the job manager 182, discovery objects for storing information that is discovered by the discovery module 150, policy data structure 170, storage footprint and storage resource information, a data structure for storing information regarding various plugins, roles, role attributes, storage connections and user information, including credentials.

In one aspect, SAL 138 stores information regarding the various storage resources that are used and available for different VMs 112A-112N. SAL 138 maintains a "storage footprint" or storage layout for different storage resources (for example, storage systems including storage devices) used by the VMs as described below in detail.

In one aspect, HAL 140 is used to communicate with another plugin that is used to collect information related to storage used by different virtual machines.

Figure 1G:
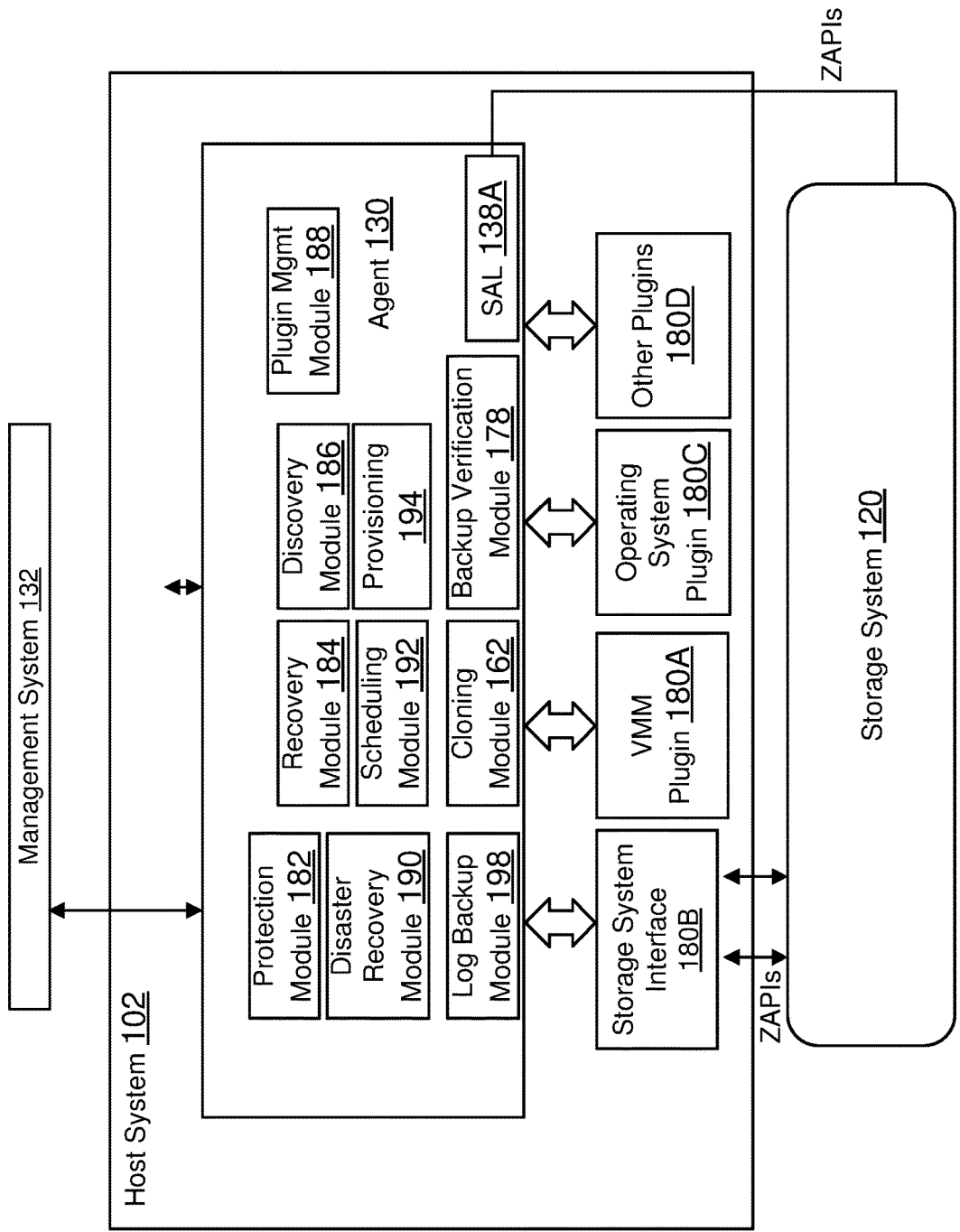
FIG. 1G shows a block diagram of an agent used by a computing system for interfacing with the management module and other components of FIG. 1A, according to one aspect of the present disclosure.

Agent 130: FIG. 1G shows an example of the agent 130 that interfaces with the management system 132 and the various plugins 180A-180D, according to one aspect of the present disclosure. The agent 130 includes a protection module 182 to manage and coordinate backup operations for VM 112 (see FIG. 1H), a recovery module 184 to manage and coordinate restore operations to restore the VM from the backup, a discovery module 186 to manage and coordinate discovery operations, a plugin management module 188 to manage plugin installation at host 102, a disaster recovery module 190 to manage and coordinate disaster recovery operations, a scheduling module 192 to schedule tasks, for example, backup and restore operations described above, a provisioning module 194 for provisioning computing and storage resources (e.g. for VM 112), a log backup module 198 for managing logs for backup operations, a cloning module 162 for managing cloning operations, a backup verification module 178 for managing and coordinating backup verification operations and SAL 138A for communicating with the storage system 120.

SAL 138A maintains the storage footprint/layout for each VM 112A-112N. SAL 138A interfaces with the storage system interface 180B to obtain storage resources that are managed by storage system 120 and made available to different applications. In one aspect, SAL 138A uses storage APIs, e.g., ZAPIs (Zephyr Application Programming Interface), REST and other APIs to send and receive data from storage system 120. An example of storage system interface 180B is SnapDrive provided by NetApp Inc. (with derogation of any trademark rights of NetApp Inc.).

The backup verification module 178 verifies a backup or replication operation. Since different applications may have different requirements, the backup verification module 178 facilitates the verification for different applications.

The cloning module 162 assists in cloning a snapshot and a log backup module 198 assists in backing up logs.

Figure 1H:
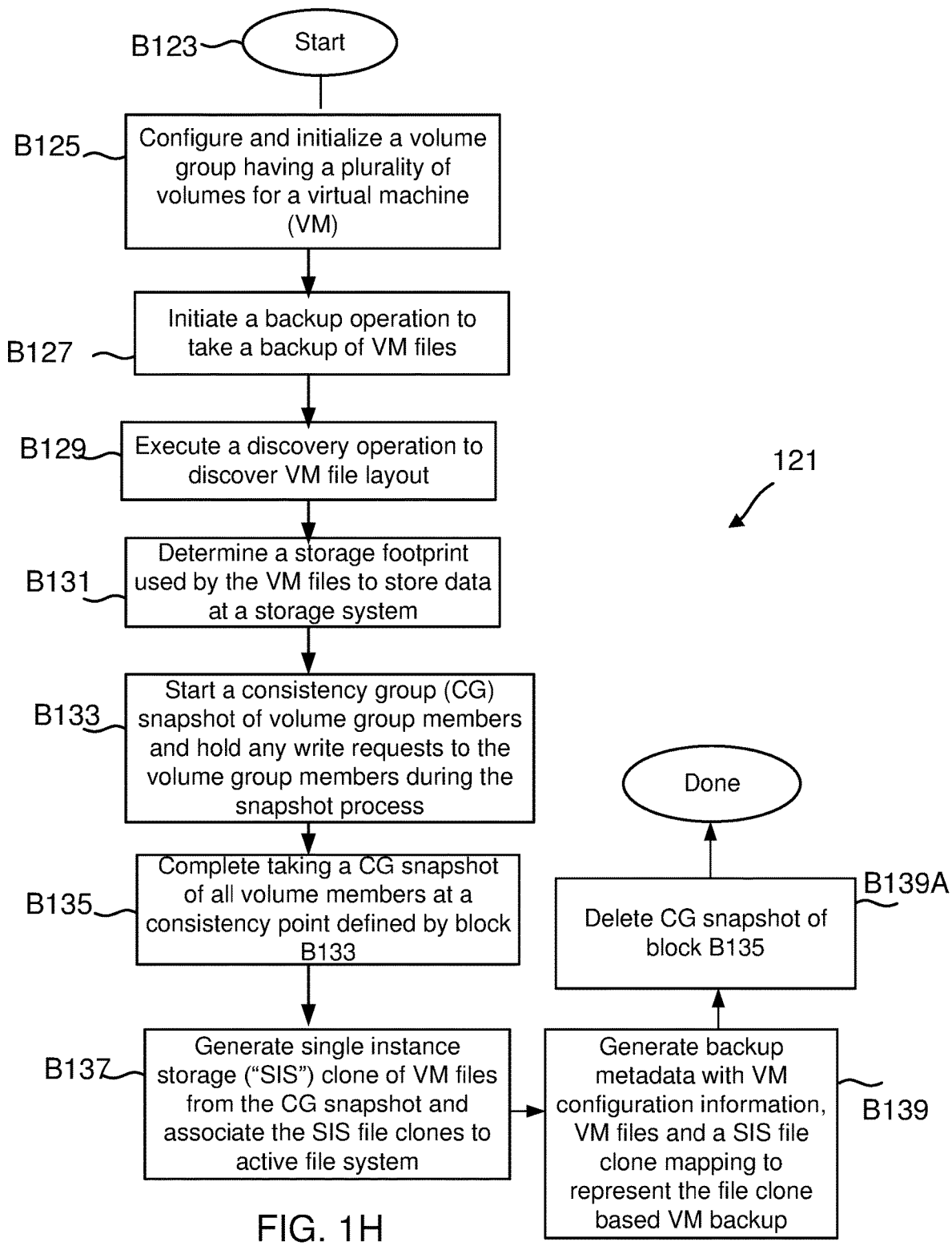
FIG. 1H shows a process flow for taking a backup of a virtual machine, according to one aspect of the present disclosure.

Backup Process Flow: FIG. 1H shows a process 121 for configuring a volume group (e.g., 107, FIG. 1D) with volumes 101A-101N used by a plurality of VMs (including VM 112 as shown in FIG. 1D) and taking a file clone-based backup of the VM files 111 (FIG. 1D), according to one aspect of the present disclosure. Process 121 begins in block B123, when the GUI module 142 (FIG. 1F) is presented on a computing device to configure the volume group 107.

In block B125, the volume group 107 with volumes 101 is configured for VM 112 and other VMs 112A-112N. The volume group 107 is identified as a unique logical structure. The volume group configuration identifies each volume 101 of the volume group 107, a storage system 120 that manages the volumes 101, a path to access the volumes 101, and access control parameters that define access parameters to read from and write to the volumes 101. To store data at volumes 101, the storage space is presented to VM 112 as a VMDK or VHD drive, as described above with respect to FIG. 1B. The VM 112 (or any application running within the VM 112) stores information using the presented drive. It is noteworthy that the stored information can also include configuration data for the VM 112. The VM configuration data identifies the VMM 106 that presents the VM, a unique VM identifier, information regarding the host 102 that hosts the VM 112, network configuration information for VM 112 (e.g., a network access address used by the VM 112 to make a network connection), information regarding a memory used by the VM 112, access control information regarding VM 112 or any other information.

In block B127, a backup operation to take a backup of VM 112 is initiated. The backup operation can be initiated automatically based on a stored protection policy for the VM 112 or on-demand. The backup operation can be initiated by the protection module 146 (FIG. 1F) sending a backup request to the agent 130 (FIG. 1G). The protection module 182 of agent 130 requests a discovery operation from the discovery module 186. The discovery module 186 instructs the VMM plugin 180C to obtain VM 112 file layout that includes a listing of VM files 111 of VM 112, where each file is uniquely identified and an associated path to access each file.

The discovery operation is executed in block B129 when the VMM plugin 180C requests the VM 112 layout from the VMM 106. The VM layout identifies the VM files 111, a VM configuration file, a virtual disk characteristics file that defines the characteristics of the virtual disk presented to VM 112, a log file that tracks VM files, as well as directory layout used by the VM 112 to store VM files 111. It is noteworthy that the VM layout details may vary based on the virtual environment where VM 112 is presented, and the adaptive aspects disclosed herein are not limited to any specific VM layout.

In block B131, a storage footprint used by VM 112 is determined. In one aspect, SAL 138A requests the storage system interface 180B to obtain the storage footprint for VM 112. The storage system interface 180B generates an API request for the storage operating system 134 to obtain this information. As an example, the storage footprint indicates the storage system 120 that manages the volumes 101 that store VM files 111, the storage locations where the data is stored for the VM 112 files or any other information. Once the VM layout and the storage footprint for VM 112 is received by the agent 130, in block B133, the protection module 182 initiates a CG snapshot for the volumes 101 that store VM 112 files. The CG snapshot is intended to create a consistency point for the files stored in volumes 101 at any given time. This ensures that when the CG snapshot is completed, all the VM 112 files are in a consistent state. To ensure consistency, all write requests directed towards volumes 101 are held for later processing, while the backup operation is in progress. The VMM plugin 180A quiesces the VM 112 (i.e., places it in an inactive state). Thereafter, in block B135, the CG snapshot of volumes 101 is taken by the storage services module 122 and the storage operating system 124. Metadata (e.g., 163, FIG. 1K) for the CG snapshot is also generated and includes a CG snapshot identifier (e.g., 163A, FIG. 1K) that identifies the CG snapshot, the CG snapshot size, the volume identifiers (e.g., 163B) that identify each volume 111 of the volume group 107, a storage system identifier 163C that identifies the storage system 120 managing the volumes, and a storage location where the snapshot is stored (e.g., a volume storage path 163D). The CG snapshot metadata may also be provided to the management module 132 and can be stored in database 176.

In block B137, a SIS clone of each file stored in the CG snapshot is generated. As mentioned above, the term SIS file clone in this context means a clone of a file that references the same physical location where data for the file is stored by the CG snapshot. For example, assume that a file F1 of VM 112 is stored at storage location L1 by the CG snapshot. A SIS clone of file F1 can be represented by F1' that also points to location L1. Thus, both F1 and F1' point to the same storage location, even though both F1 and F1' operate as independent files. In one aspect, each SIS file clone is associated with the active file system for the volume group 107. This means that the active file system can access the SIS file clones. The active file system is part of the storage operating system 134 that manages file directories and data storage at any given time.

Figure 1I:
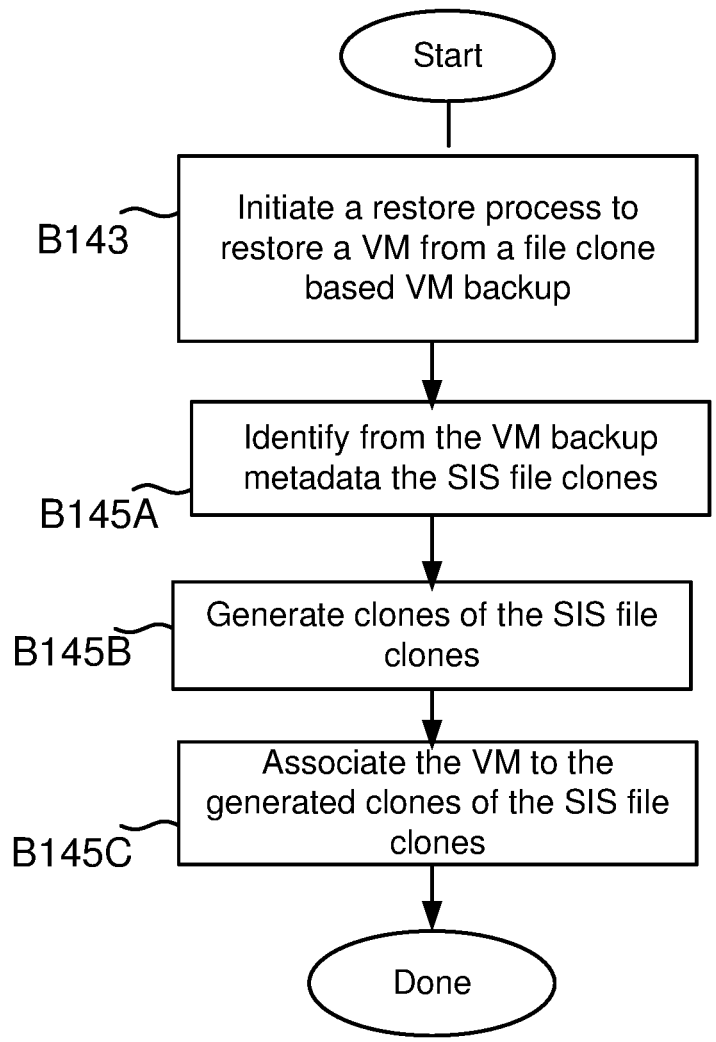
FIG. 1I shows a process flow for restoring a virtual machine, according to one aspect of the present disclosure.
Figure 1J:
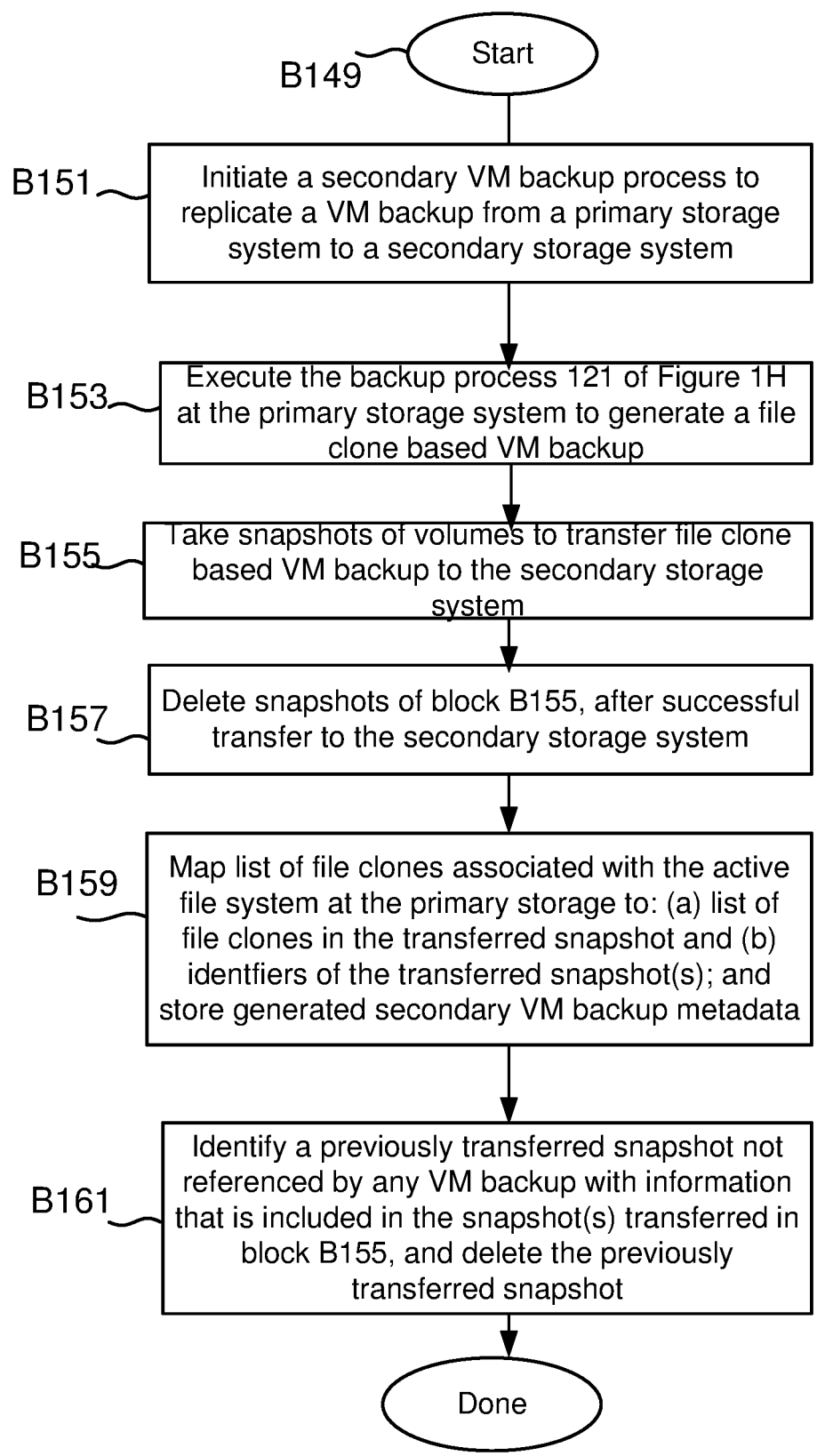
FIG. 1J shows a process flow for replicating a virtual machine, according to one aspect of the present disclosure.
Figure 1K:
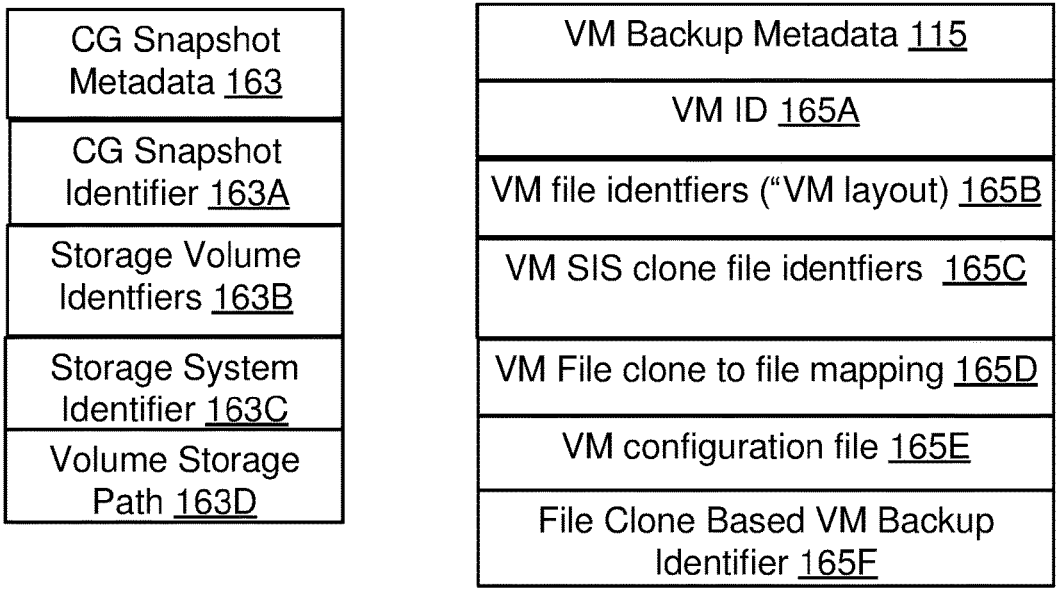
FIG. 1K shows an example of various data structures generated and used according to one aspect of the present disclosure.
Figure 1K:
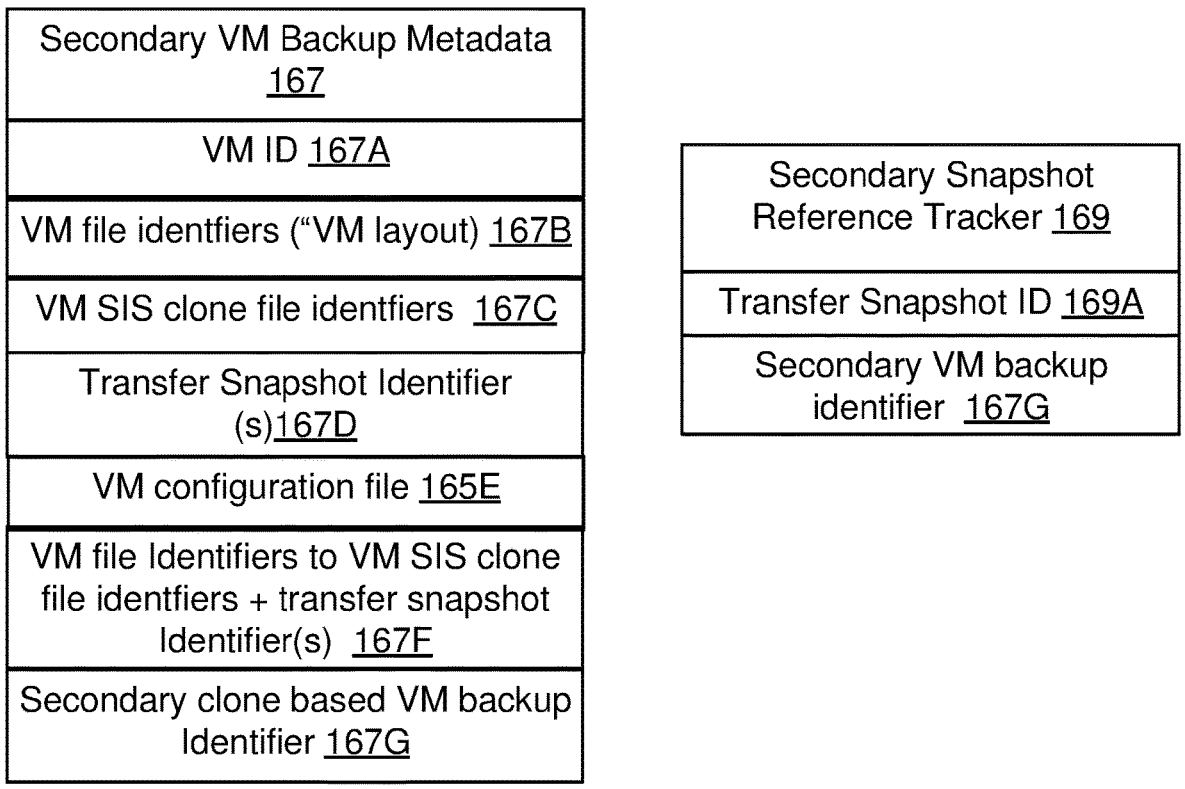

In block B139, the protection module 182 generates file clone based VM backup metadata (e.g., 115, FIG. 1K). The metadata represents the VM backup as a set of file clones. The metadata uniquely identifies the VM backup (165F, see FIG. 1K)) and includes a VM identifier 165A that identifies VM 112, VM file identifiers 165B that are obtained during discovery, VM SIS file clone identifiers (e.g., 165C) that identify the SIS clone of each file, a SIS file clone to file mapping (e.g., 165D) and a VM configuration file (e.g., 165E). This is different from conventional VM backups, where the backup metadata point to various snapshots of the volumes. For example, assume that VM 112 includes VM files vmdk1-vmdk10 stored across three volumes V1, V2 and V3. In conventional systems, a snapshot S1 of volumes V1, V2 and V3 is taken. Each file points to the snapshot S1 i.e., vmdk1 points to S1 and vmdk2 points to S1. This is undesirable when the multiple VMs share the volume group 107 because to backup each VM, one will have to take the CG snapshot for each VM and use storage to store each snapshot, which can take a large amount of storage space. In contrast to conventional systems, the technology of FIG. 1H, in block B139, the SIS clone of vmdk1 points to the active file system (i.e., associated with the active file system). The backup metadata 115 is provided to the management module 115 and stored in database 176.

Once the metadata is created, the CG snapshot is no longer needed and therefore, in block B139A, the CG snapshot generated in block B125 is deleted. This saves storage space because the CG snapshot is no longer used, and hence is more efficient than conventional systems where snapshots of multiple volumes have to retained for VM backups.

Restore Process Flow: FIG. 1I shows a process 141 for restoring a VM from a file clone based VM backup. Process 141 begins after a backup of VM 112 has been taken, as described above with respect to FIG. 1H. The backup metadata 115 is stored in database 176.

In block B143, a restore operation is initiated by the recovery module 152 (FIG. 1F). A restore request is sent to the agent 130. In block B145A, the recovery module 184 (FIG. 1G) at agent 130 identifies the SIS file clones from the backup metadata 115. In block B145B, a request is sent by SAL 138A to the storage system 120 to generate clones of the SIS file clones. The clone of each SIS file clone operates as an independent file but points to the same storage location as the SIS file clone. An example of the clone of SIS file clones is as follows: assume that a SIS file clone, F1' of a file F1 points to a storage location L1. The clone of F1' represented by F1" also points to the storage location L1.

Once the clones of the SIS file clones are created, in block B145C, the VMM plugin 180A points the VM 112 to the clones of the SIS file clones to restore the VM. Thereafter, the process ends.

Secondary Backup Process: FIG. 1J shows a backup process 147 for generating a secondary file clone-based backup (e.g., 113B, FIG. 1E), according to one aspect of the present disclosure. The secondary backup process involves taking a CG snapshot at the primary storage system 120A and generating a file clone based VM back as shown in FIG. 1H and described above. The secondary backup process begins in block B149 after VM 112 and other VMs have been using the volume group 107. In block B151, the secondary backup process is initiated, e.g., based on a stored replication policy at database 176 or on demand.

In block B153, process 121 of FIG. 1H is executed to take a file clone-based backup of VM 112, as described above. The file clone based VM backup is represented by a listing of file clones that are associated with the active file system, as described above. The file clones can be distributed across the volumes of the volume group 107. For brevity's sake the FIG. 1H process is not being described again.

In block B155, to transfer the file clone-based backup of VM 112 from the primary storage system 120A to the secondary storage system 120B, a snapshot is taken of the volumes that store the SIS file clones of the VM backup 113A. The snapshot of each volume that stores the file clones of the VM backup 113A is taken by the storage services module 122 of the storage system 120 and transferred with snapshot metadata to the secondary storage system 120B by the replication engine 117. The snapshot metadata of the transferred snapshots identifies each snapshot, a listing of file clones in each snapshot, a storage path indicating where the data for each snapshot is stored, a snapshot size, a storage system identifier that stores the snapshot or any other information. Once the transfer is complete, in block B157, the snapshots of the volumes taken at the primary storage system 120A are deleted since they are no longer needed. This saves storage space.

In block B159, the protection module 146 maps SIS file clones associated with the active file system at the primary storage system 120 to the file clones in the transferred snapshots with the snapshot identifiers of the transferred snapshots. It is noteworthy that a single snapshot identifier may be used to track the transferred snapshots. The management module 134 maintains the mapping in database 176 as part of the secondary VM backup metadata 167, as shown in FIG. 1K and described below. A reference count for the transferred snapshot identifiers is also updated in the secondary snapshot reference tracker 169 (may also be referred to as "tracker 169") shown in FIG. 1K and described below. To retain the secondary file clone-based backups and to reduce the amount of storage needed to maintain the secondary file clone-based backups, only one set of snapshots is used. This is different from conventional systems, where retention policies typically define a certain number of snapshot copies that must be maintained for secondary backups, which consumes undesirable amount of storage space, and hence is inefficient usage of storage space.

In block B161, the protection module 146 identifies a previously transferred snapshot (i.e., before the transferred snapshot(s) of block B155) with file SIS clones that are included in the transferred snapshots of block B155. Tracker 169 is evaluated to determine if the previously transferred snapshot is referenced by any other file clone based VM backup. If no other VM backup references the previously transferred snapshot, then it is deleted in block B161. For example, assume that a primary backup, P1 with file clones f1 and f2 are transferred to the secondary storage system 120B at time t1. After time t1, at time t2, a primary backup, P2 with file clones, f1, f2, f3 and f4 are transferred to the secondary storage system 120B. Since, P2 includes file clones f1 and f2, and is the latest transferred snapshot, P1 is deleted at the secondary storage system 120B, if P1 is not referenced by any other VM backup. This again saves storage space for storing secondary backups, unlike conventional systems where retention policies require the secondary storage system 120B to maintain a certain number of snapshots.

FIG. 1K shows a non-limiting example of various data structures used for executing the processes of FIGS. 1H-1J, described above. Although the various data structures are shown as separate entities, they can be combined into fewer or split into more data structures than what is shown in FIG. 1K. In one aspect, FIG. 1K shows an example of the CG snapshot metadata 163 (also referred to as "data structure 163"), VM backup metadata 115 (also referred to as "data structure 115"), secondary VM backup metadata 167 (also referred to as "data structure 167") and tracker 169 used by the process blocks of FIGS. 1H-1J, described above in detail. The data structure 163 is generated and maintained by the storage system 120, while data structures 115, 167 and 169 are maintained by the management module 134.

In one aspect, data structure 163 includes a CG snapshot identifier 163A that identifies the CG snapshot taken at the primary storage system 120A in block B125 of FIG. 1H, described above. The data structure 163 also identifies each volume of the volume group 107 with an identifier 163B and includes the storage path 163D. The storage system (e.g., 120) managing the volume may also identified by a storage system identifier 163C.

In another aspect, the data structure 115 identifies the VM 112 whose file-clone based backup is taken in FIG. 1H using a VM ID 165A. The VM files (i.e., the VM layout) is identified as 165B. The data structure 115 also includes the SIS file clone identifiers 165C that identify the SIS clone of each VM file. The data structure 115 maintains the mapping 165D that maps the VM files to SIS file clones. The data structure 115 may also include a VM configuration file (or data) 165E that provides a host processor configuration, memory configuration used by VM 112, network configuration for VM 112 or any other VM configuration data. The VM configuration file 165E can be used to restore VM 112 using the VM backup. The data structure 115 also maintains a unique identifier 165F that identifies the file clone based VM backup of VM 112. The identifier 165F is also used to locate the backup for a restore process of FIG. 1I, described above in detail.

In yet another aspect, the data structure 167 includes a VM 112 identifier 167A that identifies VM 112; VM file identifiers 167B that identify files of VM 112; VM SIS file clone identifiers 167C that identify the SIS file clones of each VM file associated with the active file system of the primary storage system 120A; snapshot identifier(s) 167D identifying a transfer snapshot of each volume that stores the SIS file clones of a file clone based VM backup 113A at the primary storage system 120A and a VM configuration file 165E. The data structure 167 also stores a mapping 167E of the VM file identifiers to the VM SIS file clone identifiers and the transfer snapshot identifiers 167D. The file clone based secondary backup is uniquely identified by an identifier 167G.

In another aspect, the tracker 169 maintains a reference count for each transferred snapshot identified by an identifier 169A and referenced by a secondary VM backup identifier 167G. The snapshot that is not referenced by a secondary VM backup can be deleted, as shown in block B161 of FIG. 1J, described above in detail.

Methods and systems for protecting virtual machines is provided. One method includes identifying a plurality of volumes (e.g. 111, FIG. 1E) (e.g. B131, FIG. 1H) of a primary storage system (e.g. 120A) for storing a plurality of data containers (e.g. 111) of a VM (e.g., 112); generating a CG snapshot of the plurality of volumes (e.g., B133/B135, FIG. 1H); associating a single instance storage clone of each data container of the VM from the CG snapshot to an active file system of the primary storage system (e.g., B137); and generating metadata for representing a VM backup as a set having each of the single instance storage clone of each data container (e.g. B139, FIG. 1H).

The method further includes transferring a snapshot of the VM backup to a secondary storage system (e.g., 120B, FIG. 1E) (B155, FIG. 1J); identifying a previous snapshot at the secondary storage system with information that has been captured in the transferred snapshot (B161, FIG. 1J); and deleting the previous snapshot when the previous snapshot is not referenced by another backup (B161, FIG. 1J).

The method also includes deleting the CG snapshot at the primary storage system after associating the single instance storage clone of each data container (B139A, FIG. 1H).

The method further includes utilizing the metadata to identify the set; and generate a clone of each single instance storage clone of each data container (B145B, FIG. 1I).

The method also includes executing a restore operation and associating the VM to the clone of each single instance storage clone of each data container (B145C, FIG. 1I).

The method further includes tracking whether the previous snapshot is referenced by another backup, before deleting the previous snapshot (B161, FIG. 1J).

The method also includes prior to generating the CG snapshot, discovering, by a first plugin, a VM layout with the plurality of data containers; and by a second plugin, a storage layout having the plurality of volumes (B129/B131, FIG. 1H).

The method further includes delaying processing of any write requests associated with the plurality of volumes, while generating the CG snapshot (B133, FIG. 1H).

In another aspect, a non-transitory machine-readable storage medium with machine executable code is provided. The code, when executed by a machine, causes the machine to: identify a plurality of volumes of a primary storage system for storing a plurality of data containers of a VM; generate a CG snapshot of the plurality of volumes; associate a single instance storage clone of each data container of the VM from the CG snapshot to an active file system of the primary storage system; and generate metadata for representing a VM backup as a set having each of the single instance storage clone of each data container.

In yet another aspect, a system, comprising a memory containing machine readable medium with machine executable code having stored thereon instructions; and a processor coupled to the memory are provided. The processor executes the machine executable code to: identify a plurality of volumes of a primary storage system for storing a plurality of data containers of a VM; generate a CG snapshot of the plurality of volumes; associate a single instance storage clone of each data container of the VM from the CG snapshot to an active file system of the primary storage system; and generate metadata for representing a VM backup as a set having each of the single instance storage clone of each data container.

Figure 2A:
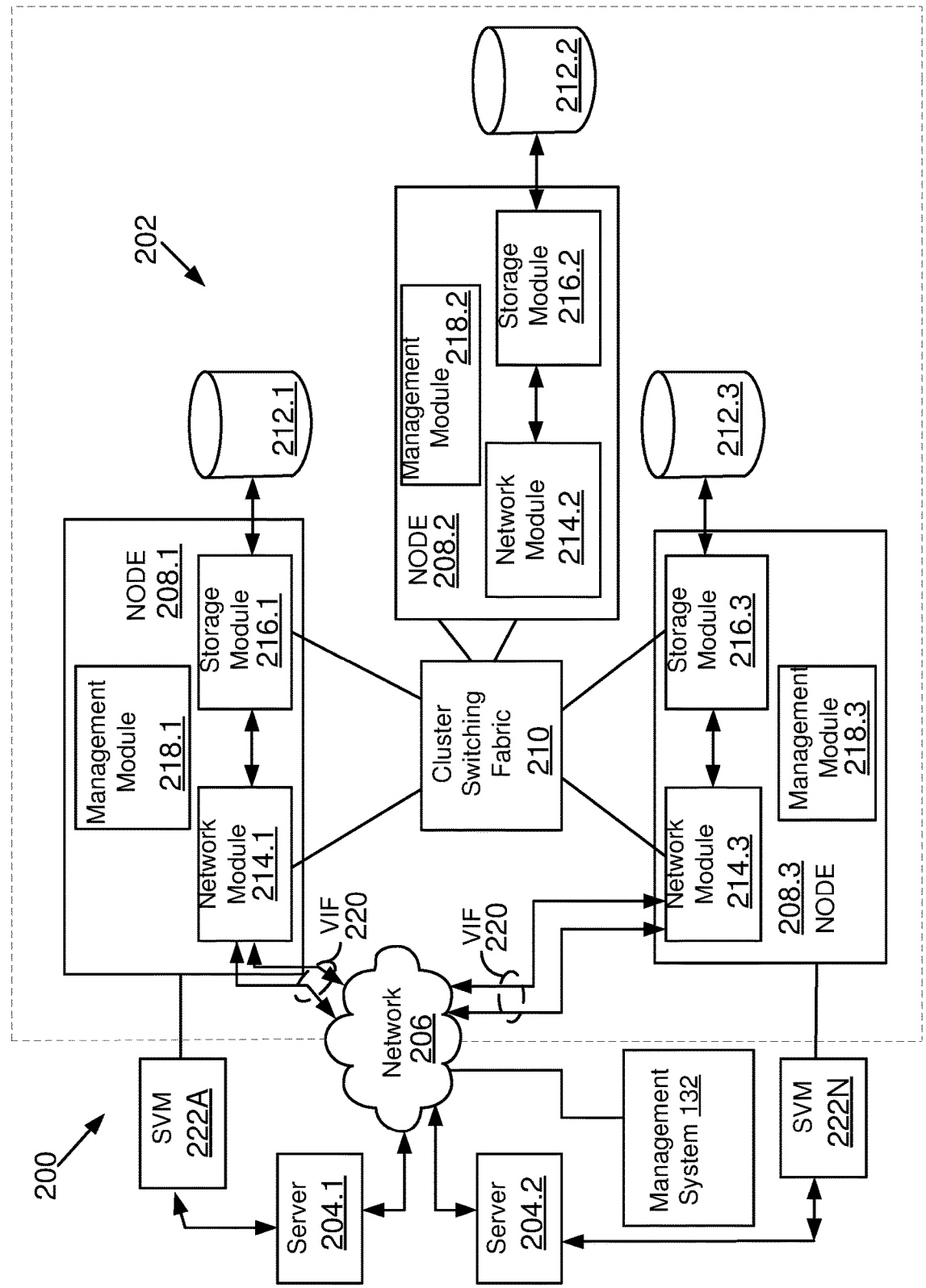
FIG. 2A shows an example of a cluster-based storage system, used according to one aspect of the present disclosure.

Clustered Storage System: FIG. 2A depicts an illustrative aspect of a shared, storage environment 200, similar to storage system 120. The shared, storage environment 200 includes the management system 132 described above, a plurality of server systems 204.1-204.2 (similar to server systems 102), a clustered storage system 202 and at least one computer network 206 communicably connecting the server systems 204.1-204.2 and the clustered storage system 202.

The clustered storage system 202 includes a plurality of nodes 208.1-208.3, a cluster switching fabric 210, and a plurality of mass storage devices 212.1-212.3 (similar to 118, FIG. 1A). Each of the plurality of nodes 208.1-208.3 is configured to include a network module, a storage module, and a management module, each of which can be implemented as a separate processor executable, or machine implemented module. Specifically, node 208.1 includes a network module 214.1, a storage module 216.1, and a management module 218.1, node 208.2 includes a network module 214.2, a storage module 216.2, and a management module 218.2, and node 208.3 includes a network module 214.3, a storage module 216.3, and a management module 218.3.

The network modules 214.1-214.3 include functionality that enables the respective nodes 208.1-208.3 to connect to one or more of the client systems 204.1-204.2 over the computer network 206, while the storage modules 216.1-216.3 connect to one or more of the storage devices 212.1-212.3.

The management modules 218.1-218.3 provide management functions for the clustered storage system 202. Accordingly, each of the plurality of server nodes 208.1-208.3 in the clustered storage server arrangement provides the functionality of a storage server.

A switched virtualization layer including a plurality of virtual interfaces (VIFs) 220 is provided below the interface between the respective network modules 214.1-214.3 and the client systems 204.1-204.2, allowing storage 212.1-212.3 associated with the nodes 208.1-208.3 to be presented to the client systems 204.1-204.2 as a single shared storage pool. For example, the switched virtualization layer may implement a virtual interface architecture. FIG. 2A depicts only the VIFs 220 at the interfaces to the network modules 214.1, 214.3 for clarity of illustration.

The clustered storage system 202 can be organized into any suitable number of virtual servers (VServer or storage virtual machines (SVM)) 222A-222N, in which each virtual storage system represents a single storage system namespace with separate network access. Each virtual storage system has a user domain and a security domain that are separate from the user and security domains of other virtual storage systems. Server systems 204 can access storage space via a VServer from any node of the clustered system 202.

Each of the nodes 208.1-208.3 may be defined as a computer adapted to provide application services to one or more of the client systems 204.1-204.2. In this context, a SVM is an instance of an application service provided to a client system. The nodes 208.1-208.3 are interconnected by the switching fabric 210, which, for example, may be embodied as a Gigabit Ethernet switch or any other switch type.

Although FIG. 2A depicts three network modules 214.1-214.3, the storage modules 216.1-216.3, and the management modules 218.1-218.3, any other suitable number of network modules, storage modules, and management modules may be provided. There may also be different numbers of network modules, storage modules, and/or management modules within the clustered storage system 202. For example, in alternative aspects, the clustered storage system 202 may include a plurality of network modules and a plurality of storage modules interconnected in a configuration that does not reflect a one-to-one correspondence between the network modules and storage modules.

The server systems 204.1-204.2 (similar to host systems 102A-102N of FIG. 1A) of FIG. 2A may be implemented as computing devices configured to interact with the respective nodes 208.1-208.3 in accordance with a client/server model of information delivery. In the presently disclosed aspect, the interaction between the server systems 204.1-204.2 and the nodes 208.1-208.3 enable the provision of network data storage services. Specifically, each server system 204.1, 204.2 may request the services of one of the respective nodes 208.1, 208.2, 208.3, and that node may return the results of the services requested by the client system by exchanging packets over the computer network 206, which may be wire-based, optical fiber, wireless, or any other suitable combination thereof. The server systems 204.1-204.2 may issue packets according to file-based access protocols, such as the NFS or CIFS protocol, when accessing information in the form of files and directories.

In a typical mode of operation, one of the server systems 204.1-204.2 (or Vms executed by a server) transmits an NFS or CIFS request for data to one of the nodes 208.1-208.3 within the clustered storage system 202, and the VIF 220 associated with the respective node receives the client request. It is noted that each VIF 220 within the clustered system 202 is a network endpoint having an associated IP address. The server request typically includes a file handle for a data file stored in a specified volume on at storage 212.1-212.3.

Figure 2B:
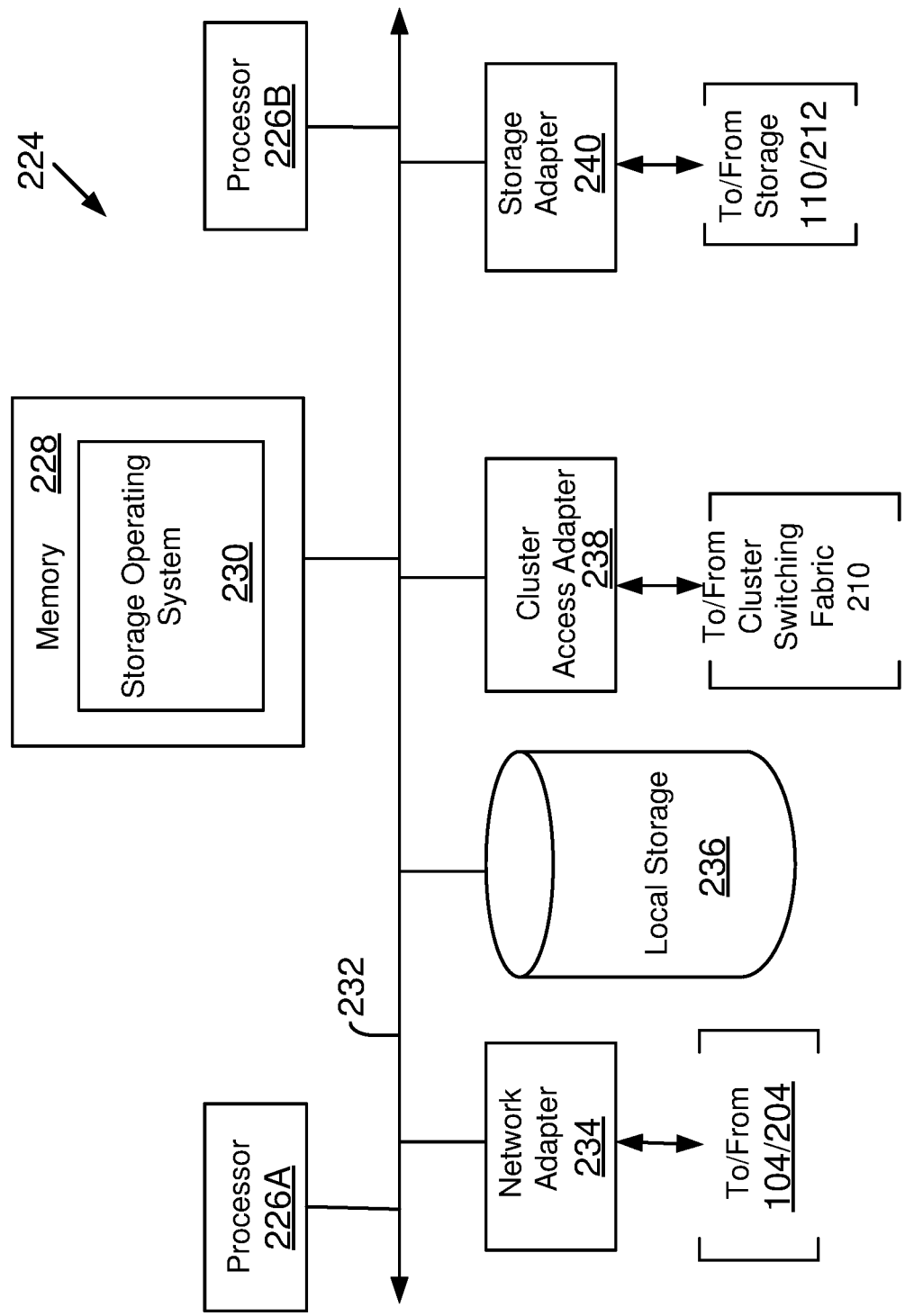
FIG. 2B shows an example of a storage system node, used according to one aspect of the present disclosure.

Storage System Node: FIG. 2B is a block diagram of a system 224, according to one aspect. System 224 may be used by a stand-alone storage system 120 and/or a storage system node operating within a clustered storage system node for performing various storage services described above with respect to FIGS. 1H-1J. System 224 communicates with SAL 138A and/or storage system interface 180B for providing information regarding stored objects, backups, clones, restore operations and others as described above.

System 224 may include a plurality of processors 226A and 226B, a memory 228, a network adapter 234, a cluster access adapter 238 (used for a cluster environment), a storage adapter 240 and local storage 236 interconnected by a system bus 232. The local storage 236 comprises one or more storage devices utilized by the processors to locally store configuration and other information.

The cluster access adapter 238 comprises a plurality of ports adapted to couple system 224 to other nodes of a cluster as described above with respect to FIG. 2A. In the illustrative aspect, Ethernet may be used as the clustering protocol and interconnect media, although it will be apparent to those skilled in the art that other types of protocols and interconnects may be utilized within the cluster architecture described herein.

System 224 is illustratively embodied as a dual processor storage system executing a storage operating system 230 (similar to 124, FIG. 1A) that preferably implements a high-level module, such as a file system, to logically organize information as a hierarchical structure of named directories, files and special types of files called virtual disks (hereinafter generally "blocks") on storage devices 114/212 using inodes 109 (FIG. 1C). However, it will be apparent to those of ordinary skill in the art that the system 224 may alternatively comprise a single or more than two processor systems. Illustratively, one processor 226 executes the functions of a network module on a node, while the other processor 226B executes the functions of a storage module.

The memory 228 illustratively comprises storage locations that are addressable by the processors and adapters for storing programmable instructions and data structures. The processor and adapters may, in turn, comprise processing elements and/or logic circuitry configured to execute the programmable instructions and manipulate the data structures. It will be apparent to those skilled in the art that other processing and memory means, including various computer readable media, may be used for storing and executing program instructions described herein.

The storage operating system 230, portions of which is typically resident in memory and executed by the processing elements, functionally organizes the system 224 by, inter alia, invoking storage operations in support of the storage service provided by storage system 120. An example of operating system 230 is the DATA ONTAP® (Registered trademark of NetApp, Inc. operating system available from NetApp, Inc. that implements a Write Anywhere File Layout (WAFL® (Registered trademark of NetApp, Inc.)) file system. However, it is expressly contemplated that any appropriate storage operating system may be enhanced for use in accordance with the inventive principles described herein. As such, where the term "ONTAP" is employed, it should be taken broadly to refer to any storage operating system that is otherwise adaptable to the teachings of this invention.

The network adapter 234 comprises a plurality of ports adapted to couple the system 224 to one or more server systems over point-to-point links, wide area networks, virtual private networks implemented over a public network (Internet) or a shared local area network. The network adapter 234 thus may comprise the mechanical, electrical and signaling circuitry needed to connect storage system 120 to the network. Illustratively, the computer network may be embodied as an Ethernet network or a FC network.

The storage adapter 240 cooperates with the storage operating system 230 executing on the system 224 to access information requested by the management system 132 and/or host 102. The information may be stored on any type of attached array of writable storage device media such as solid-state drives, storage class memory, optical devices, DVD, magnetic tape, bubble memory, electronic random-access memory, flash memory devices, micro-electro mechanical and any other similar media adapted to store information.

The storage adapter 240 comprises a plurality of ports having input/output (I/O) interface circuitry that couples to storage devices over an I/O interconnect arrangement, such as a conventional high-performance, FC link topology.

In another aspect, instead of using a separate network and storage adapter, a converged adapter is used to process both network and storage traffic.

Figure 3:
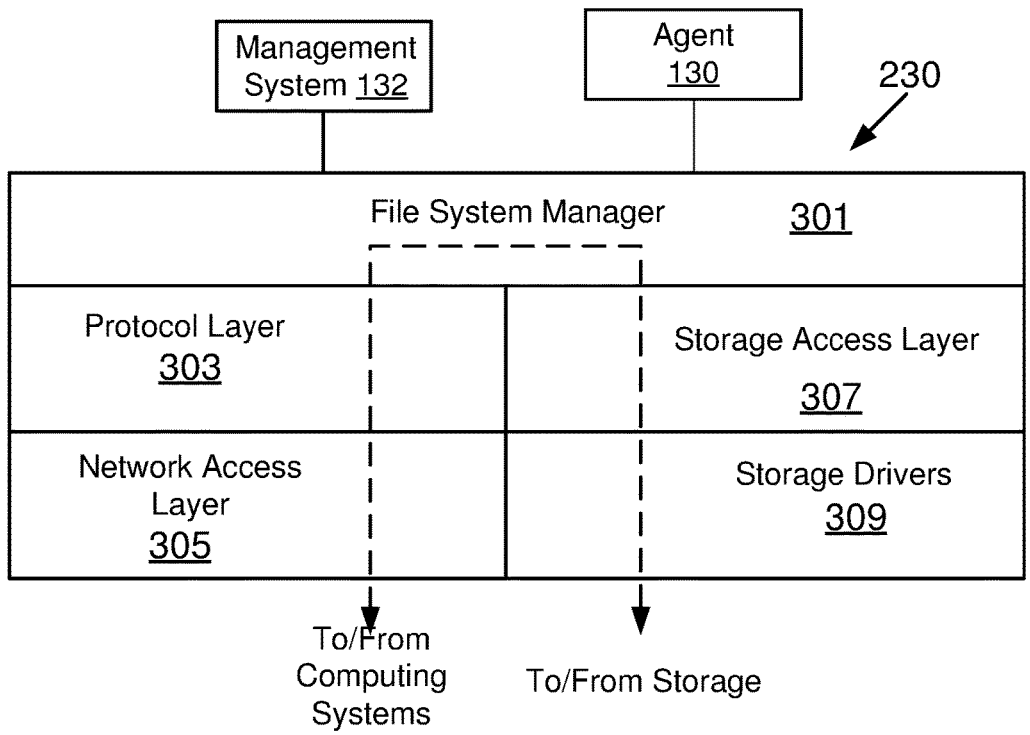
FIG. 3 shows an example of a storage operating system, used according to one aspect of the present disclosure.

Storage Operating System: FIG. 3 illustrates a generic example of storage operating system 230 (or 124) executed by storage system 120 and interfacing with the management system 132 and storage system interface 180B/SAL 138A, according to one aspect of the present disclosure. The storage operating system 230 maintains various stored objects and data containers. Storage system interface 180B and/or SAL 138A communicates with different layers of storage operating system 230 for providing storage services in system 100 including backing up and restore, described above in detail.

As an example, operating system 230 may include several modules, or "layers". These layers include a file system manager 303 that keeps track of a directory structure (hierarchy) of the data stored in storage devices and manages read/write operations, i.e., executes read/write operations on storage devices in response to server system 102 requests.

Operating system 230 may also include a protocol layer 303 and an associated network access layer 305, to allow system 200 to communicate over a network with other systems, such as server system 102 and management system 132. Protocol layer 303 may implement one or more of various higher-level network protocols, such as NFS, CIFS, Hypertext Transfer Protocol (HTTP), TCP/IP and others, as described below.

Network access layer 305 may include one or more drivers, which implement one or more lower-level protocols to communicate over the network, such as Ethernet. Interactions between server systems 102 and mass storage devices 114/212 are illustrated schematically as a path, which illustrates the flow of data through operating system 230.

The operating system 230 may also include a storage access layer 307 and an associated storage driver layer 309 to communicate with a storage device. The storage access layer 307 may implement a higher-level storage protocol, such as RAID (redundant array of inexpensive disks), while the storage driver layer 309 may implement a lower-level storage device access protocol, such as FC, SCSI or any other protocol.

It should be noted that the software "path" through the operating system layers described above needed to perform data storage access for a client request may alternatively be implemented in hardware. That is, in an alternate aspect of the disclosure, the storage access request data path may be implemented as logic circuitry embodied within a field programmable gate array (FPGA) or an ASIC. This type of hardware implementation increases the performance of the file service provided by storage system 120.

As used herein, the term "storage operating system" generally refers to the computer-executable code operable on a computer to perform a storage function that manages data access and may implement data access semantics of a general-purpose operating system. The storage operating system can also be implemented as a microkernel, an application program operating over a general-purpose operating system, such as UNIX® or Windows®, or as a general-purpose operating system with configurable functionality, which is configured for storage applications as described herein.

In addition, it will be understood to those skilled in the art that the invention described herein may apply to any type of special-purpose (e.g., file server, filer or storage serving appliance) or general-purpose computer, including a stand-alone computer or portion thereof, embodied as or including a storage system. Moreover, the teachings of this disclosure can be adapted to a variety of storage system architectures including, but not limited to, a network-attached storage environment, a storage area network and a disk assembly directly attached to a client or host computer. The term "storage system" should therefore be taken broadly to include such arrangements in addition to any subsystems configured to perform a storage function and associated with other equipment or systems.

Figure 4:
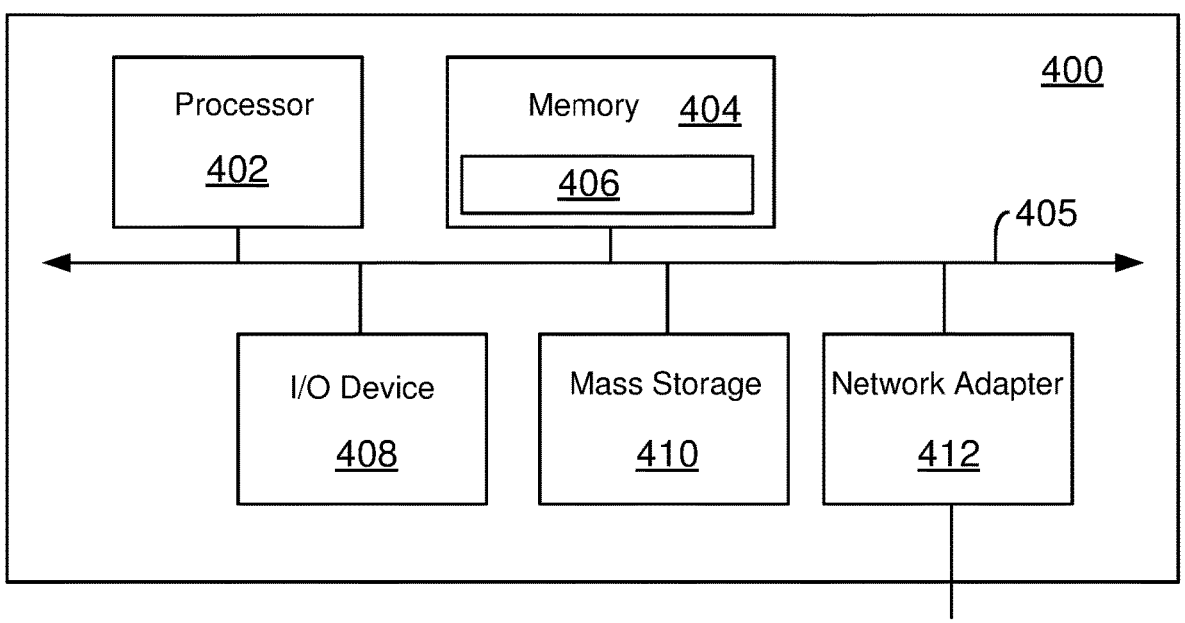
FIG. 4 shows an example of a processing system, used according to one aspect of the present disclosure.

Processing System: FIG. 4 is a high-level block diagram showing an example of the architecture of a processing system, at a high level, in which executable instructions as described above can be implemented. The processing system 400 can represent modules of the management system 132, host 102, storage system 120, and others. Note that certain standard and well-known components which are not germane to the present invention are not shown in FIG. 4.

The processing system 400 includes one or more processors 402 and memory 404, coupled to a bus system 405. The bus system 405 shown in FIG. 4 is an abstraction that represents any one or more separate physical buses and/or point-to-point connections, connected by appropriate bridges, adapters and/or controllers. The bus system 405, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processors 402 are the central processing units (CPUs) of the processing system 400 and, thus, control its overall operation. In certain aspects, the processors 402 accomplish this by executing programmable instructions stored in memory 404. A processor 402 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 404 represents any form of random-access memory (RAM), read-only memory (ROM), flash memory, or the like, or a combination of such devices. Memory 404 includes the main memory of the processing system 400. Instructions 406 which implements techniques introduced above may reside in and may be executed (by processors 402) from memory 404. For example, instructions 406 may include code used for executing the process blocks of FIGS. 1H-1J, data structures of FIG. 1K, agent 130, management module 134 and the various plugins/applications.

Also connected to the processors 402 through the bus system 405 are one or more internal mass storage devices 410, and a network adapter 412. Internal mass storage devices 410 may be or may include any conventional medium for storing large volumes of data in a non-volatile manner, such as one or more magnetic or optical based disks. The network adapter 412 provides the processing system 400 with the ability to communicate with remote devices (e.g., storage servers) over a network and may be, for example, an Ethernet adapter, a FC adapter, or the like. The processing system 400 also includes one or more input/output (I/O) devices 408 coupled to the bus system 405. The I/O devices 408 may include, for example, a display device, a keyboard, a mouse, etc.

Thus, a method and apparatus for protecting virtual machines have been described. Note that references throughout this specification to "one aspect" or "an aspect" mean that a particular feature, structure or characteristic described in connection with the aspect is included in at least one aspect of the present disclosure. Therefore, it is emphasized and should be appreciated that two or more references to "an aspect" or "one aspect" or "an alternative aspect" in various portions of this specification are not necessarily all referring to the same aspect. Furthermore, the particular features, structures or characteristics being referred to may be combined as suitable in one or more aspects of the present disclosure, as will be recognized by those of ordinary skill in the art.

While the present disclosure is described above with respect to what is currently considered its preferred aspects, it is to be understood that the disclosure is not limited to that described above. To the contrary, the disclosure is intended to cover various modifications and equivalent arrangements within the spirit and scope of the appended claims.

What is claimed is:

1. A method executed by one or more processors, comprising:
identifying a plurality of volumes of a primary storage system storing a plurality of data containers of a virtual machine ("VM");
generating a consistency group ("CG") snapshot of the plurality of volumes;
utilizing the CG snapshot to generate a single instance storage (SIS) file clone of each data container of the VM, each SIS file clone configured as an independent file that references a same physical storage location where data for each data container is stored in the CG snapshot by the primary storage system;
associating each SIS file clone to an active file system of the primary storage system;
generating VM backup metadata for representing a VM backup by a set of SIS file clones, the VM backup metadata mapping each SIS file clone to each corresponding data container;
transferring a snapshot and associated snapshot metadata of the plurality of volumes storing SIS file clones of the VM backup to a secondary storage system, the snapshot metadata listing the SIS file clones representing the VM backup;
identifying a previously transferred snapshot to the secondary storage system with the SIS file clones included in the transferred snapshot;
determining from snapshot metadata of a previously transferred snapshot that the previously transferred snapshot is not referenced by any another VM backup; and
deleting the previously transferred snapshot at the secondary storage system, in response to determining that the previously transferred snapshot is not referenced by another VM backup.

2. The method of claim 1, further comprising:
deleting the CG snapshot at the primary storage system after associating the SIS file clone of each data container to the active file system.

3. The method of claim 1, further comprising:
utilizing the VM backup metadata to identify the set of SIS file clones; and
generating a clone of each SIS file clone of each data container for a restore operation.

4. The method of claim 3, further comprising:
executing the restore operation and associating the VM to the clone of each SIS file clone of each data container.

5. The method of claim 1, further comprising:
tracking whether the previously transferred snapshot is referenced by another VM backup from a mapping of a snapshot identifier stored in the snapshot metadata of the previously transferred snapshot to an identifier of the other VM backup.

6. The method of claim 1, further comprising:
prior to generating the CG snapshot, discovering, by a first plugin, a VM layout with the plurality of data containers; and by a second plugin, a storage layout having the plurality of volumes.

7. The method of claim 1, further comprising:
delaying processing of any write requests associated with the plurality of volumes, while generating the CG snapshot.

8. A non-transitory machine-readable storage medium having stored thereon instructions comprising machine executable code, which when executed by a machine, causes the machine to:
identify a plurality of volumes of a primary storage system storing a plurality of data containers of a virtual machine ("VM");
generate a consistency group ("CG") snapshot of the plurality of volumes;
utilize the CG snapshot to generate a single instance storage (SIS) file clone of each data container of the VM, each SIS file clone configured as an independent file that references a same physical storage location where data for each data container is stored in the CG snapshot by the primary storage system;
associate each SIS file clone to an active file system of the primary storage system;
generate VM backup metadata for representing a VM backup by a set of SIS file clones, the VM backup metadata mapping each SIS file clone to each corresponding data container.

9. The non-transitory machine-readable storage medium of claim 8, wherein the machine executable code, which when executed by a machine, further causes the machine to:
transfer a snapshot and associated snapshot metadata of the plurality of volumes storing SIS file clones of the VM backup to a secondary storage system, the snapshot metadata listing the SIS file clones representing the VM backup;
identify a previously transferred snapshot to the secondary storage system with the SIS file clones included in the transferred snapshot;
determine from snapshot metadata of a previously transferred snapshot that the previously transferred snapshot is not referenced by any another VM backup; and
delete the previously transferred snapshot at the secondary storage system, in response to determining that the previously transferred snapshot is not referenced by another VM backup.

10. The non-transitory machine-readable storage medium of claim 8, wherein the machine executable code, which when executed by a machine, further causes the machine to:
delete the CG snapshot at the primary storage system after associating the SIS file clone of each data container to the active file system.

11. The non-transitory machine-readable storage medium of claim 8, wherein the machine executable code, which when executed by a machine, further causes the machine to:
utilize the VM backup metadata to identify the set of SIS file clones;
generate a clone of each SIS file clone of each data container for a restore operation;
execute the restore operation using the VM configuration file and associate the VM to the clone of each SIS file clone of each data container.

12. The non-transitory machine-readable storage medium of claim 9, wherein the machine executable code, which when executed by a machine, further causes the machine to:
track whether the previously transferred snapshot is referenced by another VM backup from a mapping of a snapshot identifier stored in the snapshot metadata of the previously transferred snapshot to an identifier of the other VM backup.

13. The non-transitory machine-readable storage medium of claim 8,
wherein the machine executable code, which when executed by a machine, further causes the machine to:

prior to generating the CG snapshot, discover, by a first plugin, a VM layout with the plurality of data containers; and by a second plugin, a storage layout having the plurality of volumes.

14. The non-transitory machine-readable storage medium of claim 8, wherein the machine executable code, which when executed by a machine, further causes the machine to:
delay processing of any write requests associated with the plurality of volumes, while generating the CG snapshot.

15. A system, comprising:
a memory containing machine readable medium comprising machine executable code having stored thereon instructions; and a processor coupled to the memory to execute the machine executable code to:
identify a plurality of volumes of a primary storage system storing a plurality of data containers of a virtual machine ("VM");
generate a consistency group ("CG") snapshot of the plurality of volumes;
utilize the CG snapshot to generate a single instance storage (SIS) file clone of each data container of the VM, each SIS file clone configured as an independent file that references a same physical storage location where data for each data container is stored in the CG snapshot by the primary storage system;
associate each SIS file clone to an active file system of the primary storage system;
generate VM backup metadata for representing a VM backup by a set of SIS file clones, the VM backup metadata mapping each SIS file clone to each corresponding data container.

16. The system of claim 15, wherein the machine executable code further causes to:
transfer a snapshot and associated snapshot metadata of the plurality of volumes storing SIS file clones of the VM backup to a secondary storage system, the snapshot metadata listing the SIS file clones representing the VM backup;
identify a previously transferred snapshot to the secondary storage system with the SIS file clones included in the transferred snapshot;
determine from snapshot metadata of a previously transferred snapshot that the previously transferred snapshot is not referenced by any another VM backup; and
delete the previously transferred snapshot at the secondary storage system, in response to determining that the previously transferred snapshot is not referenced by another VM backup.

17. The system of claim 15, wherein the machine executable code further causes to:
delete the CG snapshot at the primary storage system after associating the SIS file clone of each data container to the active file system.

18. The system of claim 15, wherein the machine executable code further causes to:
utilize the VM backup metadata to identify the set of SIS file clones;
generate a clone of each SIS file clone of each data container for a restore operation;
execute the restore operation using the VM configuration file and associate the VM to the clone of each SIS file clone of each data container.

19. The system of claim 15, wherein the machine executable code further causes to:
prior to generating the CG snapshot, discover, by a first plugin, a VM layout with the plurality of data containers; and by a second plugin, a storage layout having the plurality of volumes.

20. The system of claim 15, wherein the machine executable code further causes to:
delay processing of any write requests associated with the plurality of volumes, while generating the CG snapshot.

* * * * *